(12) United States Patent
Swanson et al.

(10) Patent No.: US 9,216,544 B2
(45) Date of Patent: Dec. 22, 2015

(54) AUTOMATED ADDITIVE MANUFACTURING SYSTEM FOR PRINTING THREE-DIMENSIONAL PARTS, PRINTING FARM THEREOF, AND METHOD OF USE THEREOF

(71) Applicant: Stratasys, Inc., Eden Prairie, MN (US)

(72) Inventors: William J. Swanson, St. Paul, MN (US); Dominic F. Mannella, Minnetonka, MN (US); Joseph E. LaBossiere, Rogers, MN (US); Michael W. Hansen, Victoria, MN (US); Saurav Upadhyaya, Minneapolis, MN (US); Ronald G. Schloesser, New Brighton, MN (US)

(73) Assignee: Stratasys, Inc., Eden Prairie, MN (US)

( * ) Notice: Subject to any disclaimer, the term of this patent is extended or adjusted under 35 U.S.C. 154(b) by 406 days.

(21) Appl. No.: 13/791,005

(22) Filed: Mar. 8, 2013

(65) Prior Publication Data
US 2014/0178588 A1 Jun. 26, 2014

Related U.S. Application Data

(63) Continuation-in-part of application No. 13/724,629, filed on Dec. 21, 2012, now Pat. No. 8,961,167.

(51) Int. Cl.
*B05D 1/26* (2006.01)
*B28B 1/16* (2006.01)
*B29C 67/00* (2006.01)

(52) U.S. Cl.
CPC .................................. *B29C 67/0059* (2013.01)

(58) Field of Classification Search
None
See application file for complete search history.

(56) References Cited

U.S. PATENT DOCUMENTS

| | | | |
|---|---|---|---|
| 5,121,329 A | 6/1992 | Crump | 364/468 |
| 5,169,081 A | 12/1992 | Goedderz | 242/54 |
| 5,173,220 A | 12/1992 | Reiff et al. | |
| 5,303,141 A | 4/1994 | Batchelder et al. | 364/149 |
| 5,312,224 A | 5/1994 | Batchelder et al. | 415/73 |
| 5,340,433 A | 8/1994 | Crump | 156/578 |
| 5,503,785 A | 4/1996 | Crump et al. | 264/40.7 |
| 5,738,817 A | 4/1998 | Danforth et al. | 264/603 |
| 5,764,521 A | 6/1998 | Batchelder et al. | 364/475.01 |

(Continued)

FOREIGN PATENT DOCUMENTS

| | | | | |
|---|---|---|---|---|
| JP | 2003191432 A | * | 7/2003 | B41F 15/36 |
| KR | 10-2002-0087250 A | | 11/2002 | |
| WO | 2012/143923 A2 | | 10/2012 | |

OTHER PUBLICATIONS

International Search Report and Written Opinion dated Mar. 27, 2014 for corresponding International Application No. PCT/US2013/075931, filed Dec. 18, 2013.

(Continued)

*Primary Examiner* — Lisha Jiang
(74) *Attorney, Agent, or Firm* — Westman, Champlin & Koehler, P.A.

(57) ABSTRACT

An additive manufacturing system comprising a platen assembly configured to restrain and release a film or substrate, a head gantry configured to retain a print head for printing a three-dimensional part on the restrained film or substrate. The additive manufacturing system may also include a removal assembly configured to draw the film having the printed three-dimensional part from the platen assembly and to cut the drawn film.

18 Claims, 19 Drawing Sheets

(56) References Cited

U.S. PATENT DOCUMENTS

| | | | | |
|---|---|---|---|---|
| 5,866,058 | A | 2/1999 | Batchelder et al. | 264/237 |
| 5,876,550 | A | 3/1999 | Feygin et al. | |
| 5,900,207 | A | 5/1999 | Danforth et al. | 264/603 |
| 5,908,184 | A | 6/1999 | Scoble | |
| 5,939,008 | A | 8/1999 | Comb et al. | 264/308 |
| 5,968,561 | A | 10/1999 | Batchelder et al. | 425/375 |
| 6,004,124 | A | 12/1999 | Swanson et al. | 425/375 |
| 6,022,207 | A | 2/2000 | Dahlin et al. | 425/145 |
| 6,054,077 | A | 4/2000 | Comb et al. | 264/40.7 |
| 6,067,480 | A | 5/2000 | Stuffle et al. | 700/109 |
| 6,070,107 | A | 5/2000 | Lombardi et al. | 700/119 |
| 6,085,957 | A | 7/2000 | Zinniel et al. | 226/8 |
| 6,129,872 | A | 10/2000 | Jang | 264/75 |
| 6,228,923 | B1 | 5/2001 | Lombardi et al. | 524/425 |
| 6,257,517 | B1 | 7/2001 | Babish et al. | 242/365.6 |
| 6,547,995 | B1 | 4/2003 | Comb | 264/40.1 |
| 6,645,412 | B2 | 11/2003 | Priedeman, Jr. | 264/219 |
| 6,685,866 | B2 | 2/2004 | Swanson et al. | 264/308 |
| 6,722,872 | B1 | 4/2004 | Swanson et al. | 425/225 |
| 6,730,252 | B1 | 5/2004 | Teoh et al. | 264/178 |
| 6,749,414 | B1 | 6/2004 | Hanson et al. | 425/130 |
| 6,790,403 | B1 | 9/2004 | Priedeman, Jr. et al. | 264/442 |
| 6,814,907 | B1 | 11/2004 | Comb | 264/40.07 |
| 6,824,714 | B1 | 11/2004 | Turck et al. | |
| 6,869,559 | B2 | 3/2005 | Hopkins | 264/489 |
| 6,923,634 | B2 | 8/2005 | Swanson et al. | 425/169 |
| 6,976,627 | B1 | 12/2005 | Culp et al. | 235/462.01 |
| 6,998,087 | B1 | 2/2006 | Hanson et al. | 264/308 |
| 7,122,246 | B2 | 10/2006 | Comb et al. | 428/364 |
| 7,172,715 | B2 | 2/2007 | Swanson et al. | 264/39 |
| 7,236,166 | B2 | 6/2007 | Zinniel et al. | 345/419 |
| 7,261,533 | B2 | 8/2007 | Wrosz et al. | 425/110 |
| 7,306,152 | B2 | 12/2007 | Culp et al. | 235/462.01 |
| 7,384,255 | B2 | 6/2008 | LaBossiere et al. | 425/190 |
| 7,481,647 | B2 | 1/2009 | Sambu et al. | 425/436 |
| 7,572,121 | B2 | 8/2009 | Wrosz et al. | 425/110 |
| 7,604,181 | B2 | 10/2009 | Culp et al. | |
| 7,604,470 | B2 | 10/2009 | LaBossiere et al. | 425/131.1 |
| 7,625,200 | B2 | 12/2009 | Leavitt | 425/375 |
| 7,896,209 | B2 | 3/2011 | Batchelder et al. | 26/53 |
| 7,905,408 | B2 | 3/2011 | Culp et al. | |
| 7,917,243 | B2 | 3/2011 | Kozlak et al. | 700/119 |
| 7,938,351 | B2 | 5/2011 | Taatjes et al. | 242/171 |
| 7,938,356 | B2 | 5/2011 | Taatjes et al. | 242/580 |
| 8,033,811 | B2 | 10/2011 | Swanson et al. | 425/375 |
| 8,070,473 | B2 | 12/2011 | Kozlak | 425/375 |
| 8,075,300 | B2 | 12/2011 | Zinniel | 425/445 |
| 8,153,182 | B2 | 4/2012 | Comb et al. | 427/8 |
| 8,221,669 | B2 | 7/2012 | Batchelder et al. | 264/308 |
| 8,226,395 | B2 | 7/2012 | Pax et al. | 425/174.4 |
| 8,282,380 | B2 | 10/2012 | Pax et al. | 425/375 |
| 8,287,794 | B2 | 10/2012 | Pax et al. | 264/308 |
| 2005/0129941 | A1 | 6/2005 | Comb et al. | 428/364 |
| 2005/0147781 | A1 | 7/2005 | Dronzek, Jr. et al. | |
| 2005/0173855 | A1* | 8/2005 | Dunn et al. | 269/900 |
| 2005/0196525 | A1 | 9/2005 | Phillips | |
| 2007/0003656 | A1 | 1/2007 | LaBossiere et al. | 425/375 |
| 2007/0013724 | A1 | 1/2007 | Swift | |
| 2007/0071902 | A1 | 3/2007 | Dietrich et al. | |
| 2007/0228590 | A1 | 10/2007 | LaBossiere et al. | 264/40.1 |
| 2008/0015727 | A1 | 1/2008 | Dunne et al. | |
| 2008/0086947 | A1 | 4/2008 | Crown | |
| 2009/0035405 | A1 | 2/2009 | Leavitt | 425/97 |
| 2009/0050700 | A1* | 2/2009 | Kamijoh et al. | 235/440 |
| 2009/0173443 | A1 | 7/2009 | Kozlak et al. | 156/303.1 |
| 2009/0263582 | A1 | 10/2009 | Batchelder | 427/256 |
| 2009/0273122 | A1 | 11/2009 | Batchelder et al. | 264/401 |
| 2009/0274540 | A1 | 11/2009 | Batchelder et al. | 414/431 |
| 2010/0096072 | A1 | 4/2010 | Hopkins et al. | 156/155 |
| 2010/0096485 | A1 | 4/2010 | Taatjes et al. | 242/171 |
| 2010/0096489 | A1 | 4/2010 | Taatjes et al. | 242/520 |
| 2010/0098319 | A1* | 4/2010 | Gombert et al. | 382/141 |
| 2010/0100222 | A1 | 4/2010 | Skubic et al. | |
| 2010/0100224 | A1 | 4/2010 | Comb et al. | 700/118 |
| 2010/0283172 | A1 | 11/2010 | Swanson | 264/80 |
| 2010/0327479 | A1 | 12/2010 | Zinniel et al. | 264/172.14 |
| 2011/0074065 | A1 | 3/2011 | Batchelder et al. | 264/308 |
| 2011/0076495 | A1 | 3/2011 | Batchelder et al. | 428/369 |
| 2011/0076496 | A1 | 3/2011 | Batchelder et al. | 428/373 |
| 2011/0117268 | A1 | 5/2011 | Batchelder et al. | 427/8 |
| 2011/0121476 | A1 | 5/2011 | Batchelder et al. | 264/40.1 |
| 2011/0186081 | A1 | 8/2011 | Dunn et al. | 134/18 |
| 2011/0233804 | A1 | 9/2011 | Batchelder et al. | 264/40.4 |
| 2011/0241947 | A1 | 10/2011 | Scott et al. | 343/700 |
| 2012/0065755 | A1 | 3/2012 | Steingart et al. | |
| 2012/0067501 | A1 | 3/2012 | Lyons | 156/64 |
| 2012/0068378 | A1 | 3/2012 | Swanson et al. | 264/308 |
| 2012/0070523 | A1 | 3/2012 | Swanson et al. | 425/96 |
| 2012/0162314 | A1 | 6/2012 | Swanson et al. | 347/37 |
| 2012/0164256 | A1 | 6/2012 | Swanson et al. | 425/162 |
| 2012/0201960 | A1 | 8/2012 | Hartmann et al. | |
| 2013/0075957 | A1 | 3/2013 | Swanson et al. | 264/405 |
| 2013/0078073 | A1 | 3/2013 | Comb et al. | 414/749.1 |
| 2013/0161432 | A1 | 6/2013 | Mannella et al. | |
| 2013/0161442 | A1 | 6/2013 | Mannella et al. | |
| 2013/0242317 | A1 | 9/2013 | Leavitt et al. | |

OTHER PUBLICATIONS

Thomsonbsa website, © 2000-2013: HTTP://http://www.thomsonbsa.com/.

* cited by examiner

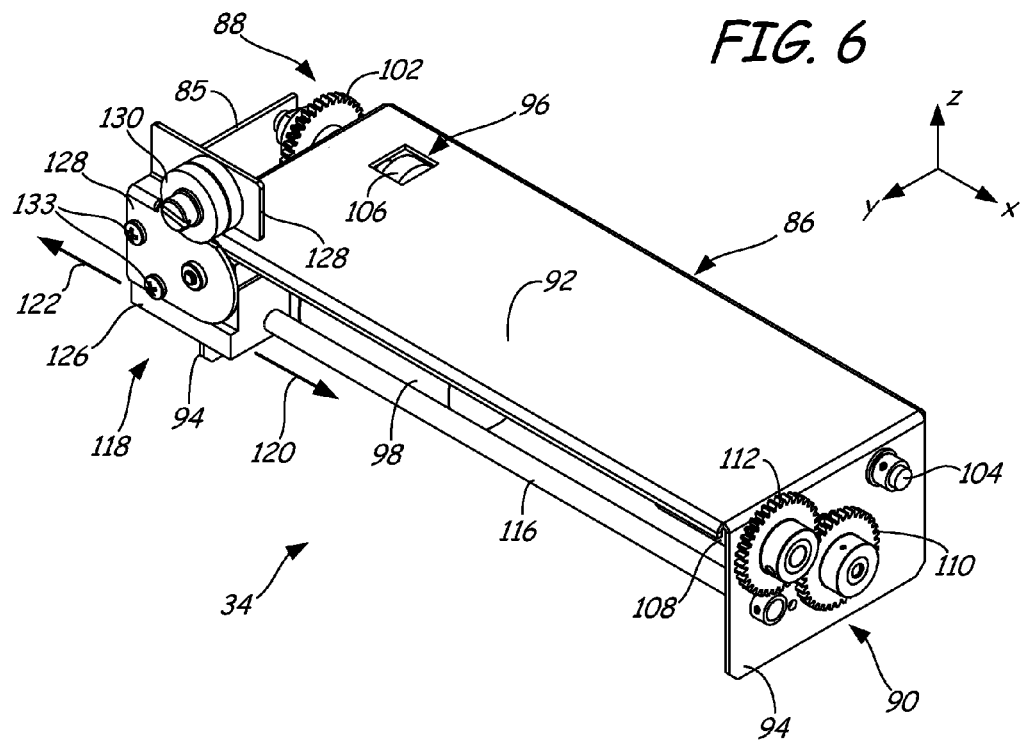
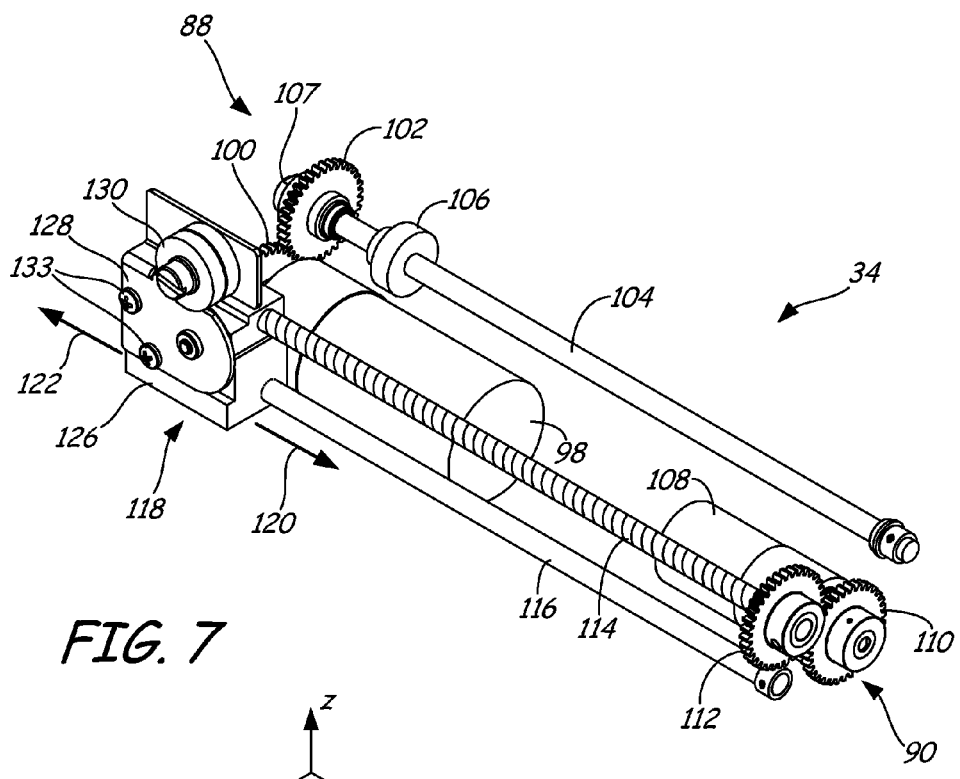

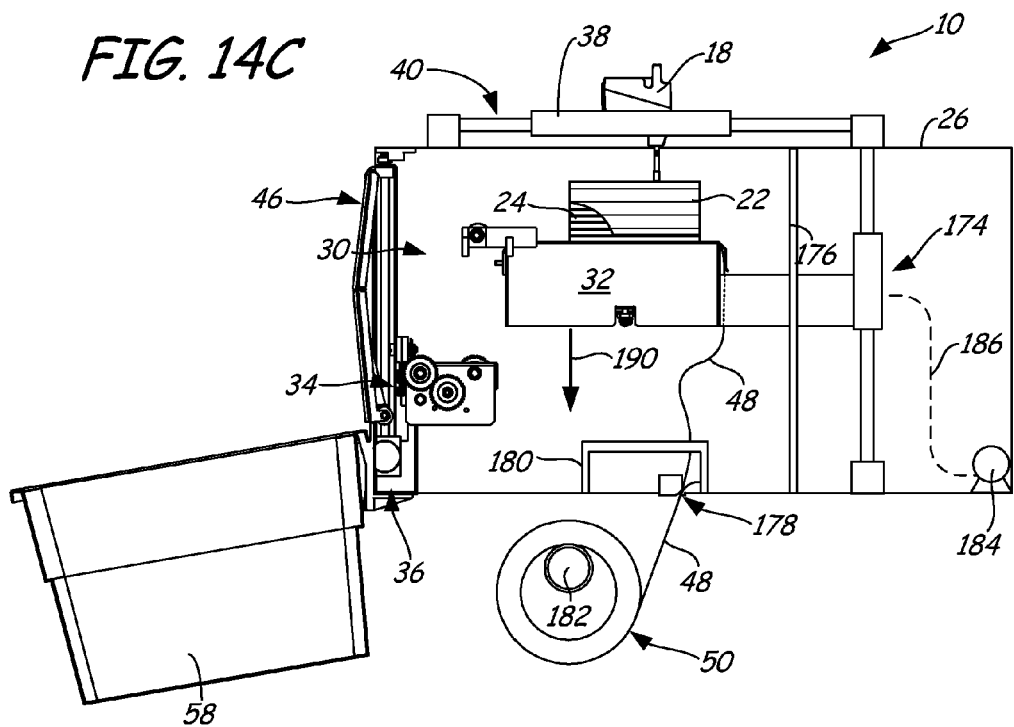

AUTOMATED ADDITIVE MANUFACTURING SYSTEM FOR PRINTING THREE-DIMENSIONAL PARTS, PRINTING FARM THEREOF, AND METHOD OF USE THEREOF

CROSS-REFERENCE TO RELATED APPLICATION(S)

This application is a continuation-in-part of U.S. patent application Ser. No. 13/724,629 (now U.S. Pat. No. 8,961, 167), filed on Dec. 21, 2012, which is entitled "Automated Additive Manufacturing System For Printing Three-Dimensional Parts, Printing Farm Thereof, And Method Of Use Thereof", and the disclosure of which is incorporated by reference in its entirety.

BACKGROUND

The present disclosure relates to additive manufacturing systems for printing or otherwise building three-dimensional (3D) parts with layer-based, additive manufacturing techniques. In particular, the present disclosure relates to additive manufacturing systems for printing multiple, successive 3D parts in an automated manner.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to an additive manufacturing system that includes a platen gantry, a platen assembly, and head gantry, and a removal assembly, and preferably prints and removes 3D parts (and any associated support structures) in an automated manner. The platen assembly includes a platform portion configured to be operably retained by the platen gantry, and having a surface. The platen assembly also includes a retention bracket biased towards the platform portion and configured to engage the surface of the platform portion for restraining a film therebetween, and to disengage from the surface to release the film. The head gantry is configured to retain a print head for printing a 3D part on the restrained film. The removal unit is configured to draw the film having the printed 3D part from the platen assembly and, optionally, to cut the drawn film.

Another aspect of the present disclosure is directed to an additive manufacturing system that includes a platen assembly configured to restrain and release a film, and a head gantry configured to retain a print head for printing 3D parts onto the restrained film. The system also includes a removal assembly configured to draw the released film having the printed three-dimensional parts, and a mechanism for retaining a supply of the film, wherein the mechanism is not retained by the platen assembly.

Another aspect of the present disclosure is directed to a method for printing a three-dimensional part with an additive manufacturing system. The method includes restraining a segment of a film against a surface of a platen assembly, printing the 3D part on the restrained film segment, releasing the film segment having the printed 3D part, drawing the released film segment having the printed 3D part from the platen assembly to a removal assembly, and cutting the drawn film segment having the printed 3D part to separate the film segment from a subsequent segment of the film.

Another aspect of the present disclosure is directed to a method for printing a 3D part with an additive manufacturing system, which includes securing a film or substrate to a platen assembly of the additive manufacturing system. The method also includes printing an information-containing part on the secured film or substrate, where the information-containing part comprises encoded information relating to the 3D part, and printing the 3D part on the secured film or substrate. The method further includes releasing the film or substrate having the printed information-containing part and the printed 3D part from the platen assembly, and removing the released film or substrate having the printed information-containing part and the printed 3D part from the additive manufacturing system.

Another aspect of the present disclosure is directed to a method for printing a 3D part with an additive manufacturing system, which includes securing a substrate to a platen assembly of the additive manufacturing system, where the substrate comprises a plurality of holes. The method also includes printing one or more layers of a support structure on the secured substrate, where portions of the one or more printed layers penetrate into at least a portion of the holes in a sprue-like manner to form mushroom heads that lock the support structure to the secured substrate. The method further includes printing the 3D part on the one or more printed layers of the support structure, releasing the substrate having printed 3D part from the platen assembly, and removing the 3D part and at least a portion of the support structure from the substrate.

DEFINITIONS

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "printing onto", "printing on" such as for "printing a 3D part on a film" include direct and indirect printings onto the film. A "direct printing" involves depositing a flowable material directly onto the film to form a layer that adheres to the film. In comparison, an "indirect printing" involves depositing a flowable material onto intermediate layers that are directly printed onto the film. As such, unless otherwise specified, printing a 3D part onto a film may include (i) a situation in which the 3D part is directly printed onto to the film, (ii) a situation in which the 3D part is directly printed onto intermediate layer(s) (e.g., of a support structure), where the intermediate layer(s) are directly printed onto the film, and (iii) a combination of situations (i) and (ii).

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIG. 6 is a top, right isometric view of the removal assembly.

FIG. 7 is a top, right isometric view of subcomponents of the removal assembly.

FIGS. 14A-14G are schematic illustrations of the system, depicting a process for printing and removing a 3D part and support structure.

DETAILED DESCRIPTION

The present disclosure is directed to an additive manufacturing system for printing and removing 3D parts and support structures in an automated manner. In a conventional additive manufacturing system, a user is typically required to manually remove a printed 3D part from the system after the printing operation is completed. As can be appreciated, this can increase time and labor to print 3D parts, and requires users to physically remove the 3D parts prior to starting subsequent printing operations. In comparison, the additive manufacturing system of the present disclosure is capable of printing multiple successive 3D parts, where the system is also configured to remove the 3D parts without requiring user intervention.

Figure 1:
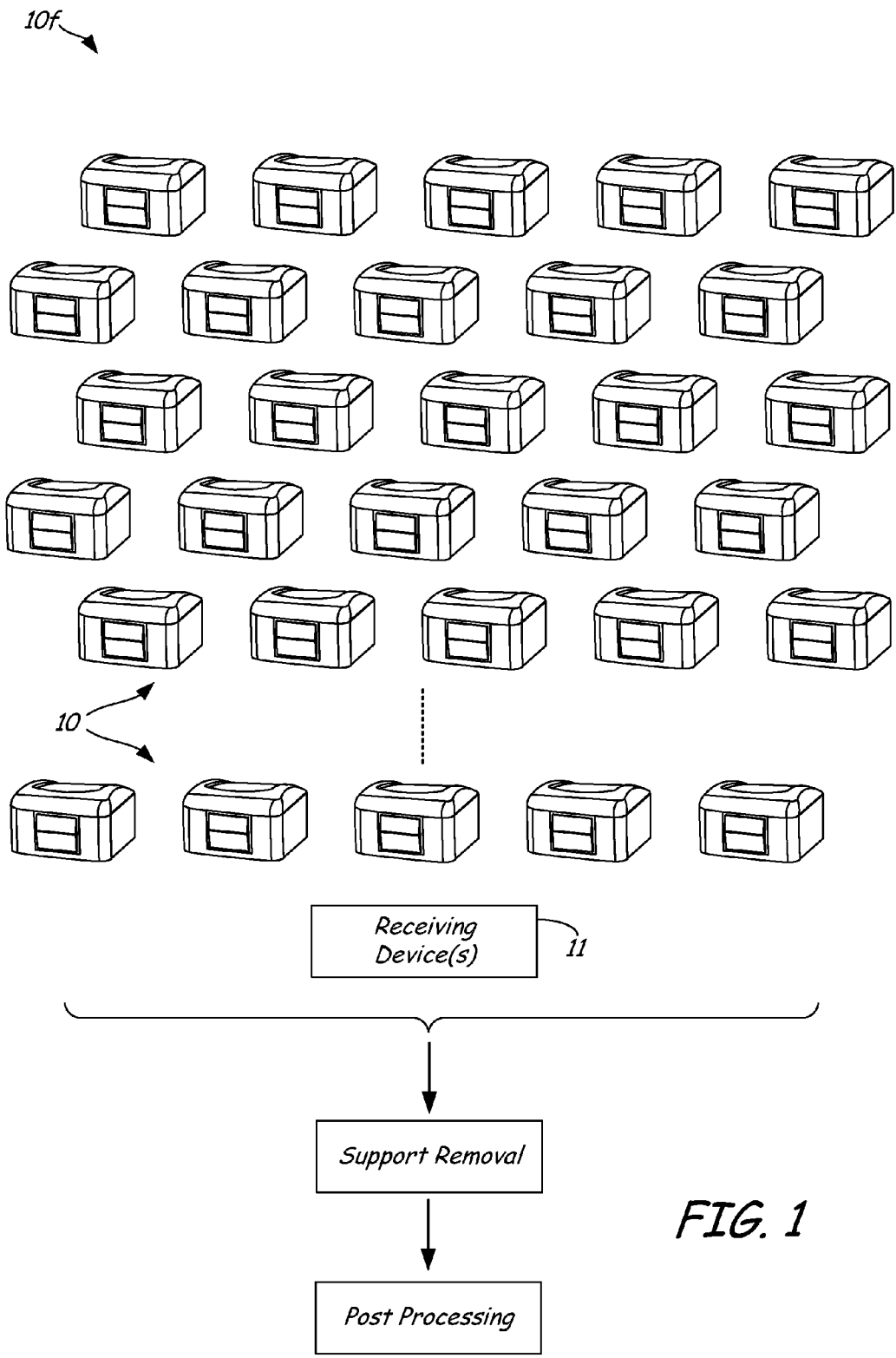
FIG. 1 is a schematic illustration of a printing farm that includes a plurality of automated additive manufacturing system of the present disclosure.

The additive manufacturing system of the present disclosure may also be incorporated into a printing farm, such as printing farm 10f illustrated in FIG. 1. As shown, printing farm 10f includes multiple additive manufacturing systems 10, where at least a portion of the systems 10, and more preferably each system 10, prints and removes 3D parts in an automated manner without requiring user intervention. After each 3D part is printed and removed from one of the systems 10, such as with one or more receiving devices 11 (e.g., receptacles, conveyor mechanisms, etc. . . . ), the support structure associated with the 3D part may be removed (if necessary), and the 3D part may optionally undergo one or more post-processing steps (e.g., vapor smoothing). Accordingly, printing farm 10f is suitable for use with automated support removal systems (e.g., as disclosed in Swanson et al., U.S. patent application Ser. No. 13/241,454) and automated post-processing systems (e.g., as disclosed in Zinniel, U.S. Pat. No. 8,075,300).

As discussed below, each system 10 may include a platform assembly and a removal assembly, which may draw successive segments of a film from a spool supply (or other supply source). Briefly, the platform assembly and the removal assembly may engage each other to draw the film across a top surface of the platform assembly, where the film is then preferably restrained against the top surface. The system 10 may then print a 3D part (or multiple 3D parts) and, optionally, one or more support structures on the restrained film.

After the printing operation is completed, the platform assembly may release the film, and the removal assembly may then draw the film from the platform assembly and cut the film to separate the segment retaining printed 3D part from the remainder of the film. The cut segment with the printed 3D part may then exit the system and be received by receiving device(s) 11 (e.g., dropped out of the system into a bin, other receptacle, or a conveyor mechanism). In some embodiments, such as those in which the system 10 includes a heated chamber, the system 10 may also include an automated door. In these embodiments, the given system 10 may also open the automated door, allowing the cut film segment with the printed 3D part to exit from the system 10.

After the printed 3D part exits the system 10, the same system 10 may then begin printing a subsequent 3D part following the same steps. As can be appreciated, the use of printing farm 10f, with each system 10 operating in an automated manner, can substantially increase throughput of the printing operations without sacrificing part quality. This can accordingly reduce manufacturing times and costs, and increasing operational efficiencies.

Figure 2:
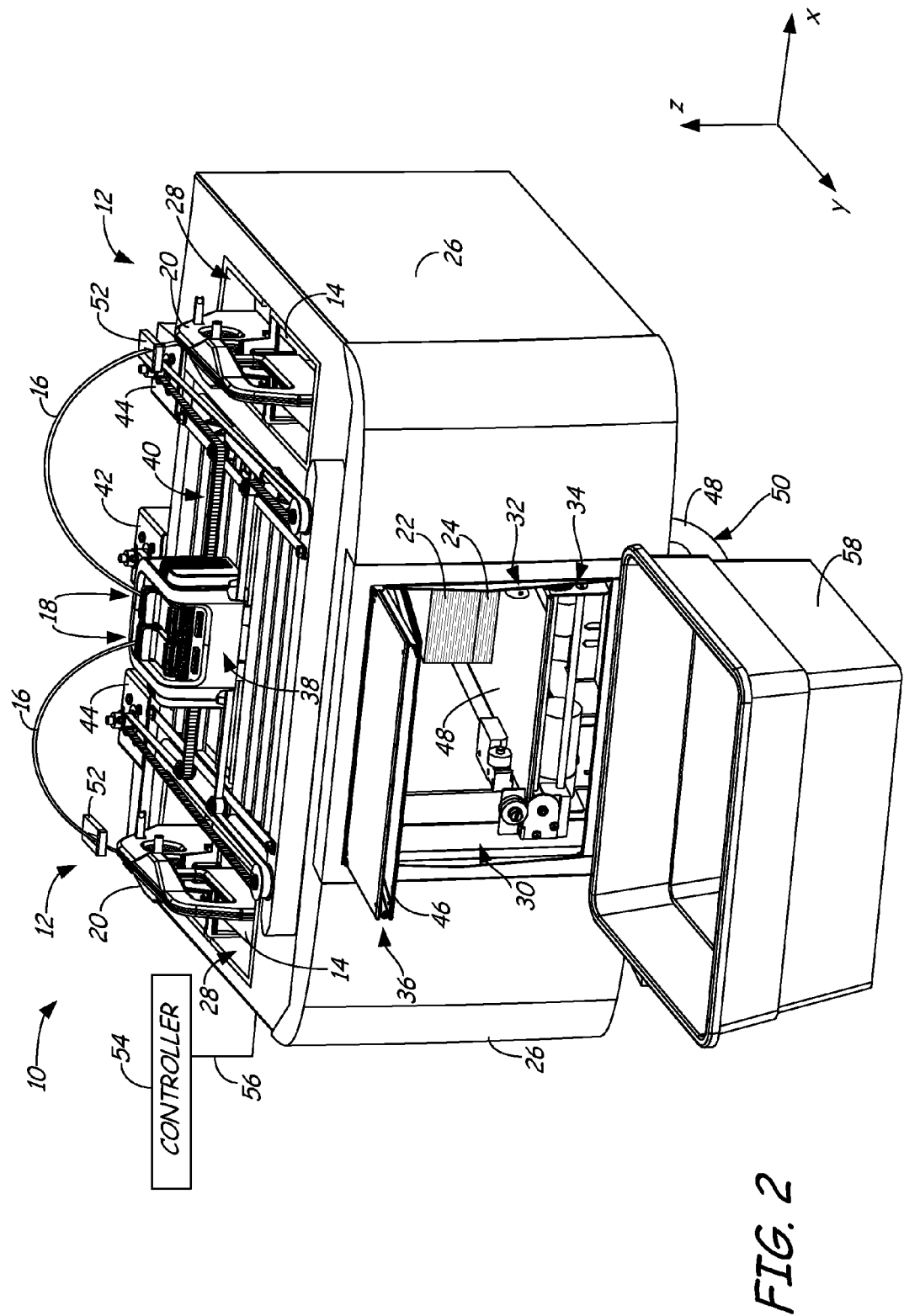
FIG. 2 is a top, front perspective view of an automated additive manufacturing system of the present disclosure in use with consumable assemblies.

FIG. 2 shows an example system 10 in use with two consumable assemblies 12, where system 10 is configured to print and remove 3D parts and support structures in an automated manner, preferably without user intervention. Each consumable assembly 12 is an easily loadable, removable, and replaceable container device that retains a supply of a consumable filament for printing with system 10. Typically, one of the consumable assemblies 12 contains a part material filament ("part material consumable assembly"), and the other consumable assembly 12 contains a support material filament ("support material consumable assembly"). However, both consumable assemblies 12 may be identical in structure.

In the shown embodiment, each consumable assembly 12 includes container portion 14, guide tube 16, print head 18, and handle 20. Container portion 14 may retain a spool or coil of a consumable filament, such as discussed in Mannella et al., U.S. patent application Ser. Nos. 13/334,910 and 13/334,921. In some embodiments, container portions 14 of consumable assemblies 12 may retain large supplies (e.g., 900 cubic inches) of the consumable filaments. This is particularly suitable for use in a printing farm of automated systems 10 to increase the duration between change-overs of each consumable assembly 12.

Guide tube 16 interconnects container portion 14 and print head 18, where the drive mechanism of print head 18 draws successive segments of the consumable filament from container portion 14 and through guide tube 16. In this embodiment, guide tube 16 and print head 18 are subcomponents of consumable assembly 12, and may be interchanged to and from system 10 with each consumable assembly 12. In alternative embodiments, guide tube 16 and/or print head 18 may be components of system 10, rather than subcomponents of consumable assemblies 12.

System 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique; and for removing the printed 3D parts and support structures in an automated manner. Suitable additive manufacturing systems for system 10 include extrusion-based systems developed by Stratasys, Inc., Eden Prairie, Minn. under the trademarks "FDM" and "FUSED DEPOSITION MODELING". As shown, system 10 includes system casing 26, two bays 28, chamber 30, platen assembly 32, removal assembly 34, door assembly 36, head carriage 38, head gantry 40, z-axis motor 42, and a pair of x-y motors 44.

System casing 26 is a structural component of system 10 and may include multiple structural sub-components such as support frames, housing walls, and the like. In the shown embodiment, system casing 26 defines the dimensions of bays 28, and of chamber 30. Bays 28 are container bays configured to respectively receive container portions 14 of consumable assemblies 12. Typically, each of bays 28 may be intended to receive either a part material consumable assembly 12 or a support material consumable assembly 12. In an alternative embodiment, bays 28 may be omitted to reduce the overall footprint of system 10. In this embodiment, container portions 14 may stand adjacent to system casing 26, while providing sufficient ranges of movement for guide tubes 16 and print heads 18. Bays 28, however, provide convenient locations for loading consumable assemblies 12.

Chamber 30 is an enclosable environment that contains platen assembly 32 and removal assembly 34 for printing 3D part 22 and support structure 24, as discussed below. Chamber 30 may be heated (e.g., with circulating heated air) to reduce the rate at which the part and support materials solidify after being extruded and deposited (e.g., to reduce distortions and curling), or otherwise maintained to provide a controlled environment. In alternative embodiments, chamber 30 may be omitted and/or replaced with different types of build environments. For example, 3D part 22 and support structure 24 may be built in a build environment that is open to ambient conditions or may be enclosed with alternative structures (e.g., flexible curtains).

In the shown embodiment, chamber 30 is accessible through door assembly 36, which, in the shown embodiment, includes bi-fold door 46 (shown in an open state). Door assembly 36 allows the printed 3D part 22 and support structure 24 to be removed from system 10 in an automated manner via platen assembly 32 and removal assembly 34, as discussed below. While illustrated with bi-fold door 46, door assembly 36 may alternatively include different automated door designs, such as accordion-based doors, hinged doors, and the like.

Platen assembly 32 is supported by a platen gantry of system 10 (not shown in FIG. 2), where the platen gantry is configured to move platen assembly 32 along (or substantially along) the vertical z-axis and is powered by z-axis motor 42. Platen assembly 32 is configured to receive and restrain film 48. Film 48 is preferably a flexible film that functions as a receiving surface for printing 3D part 22 and support structure 24, and is drawn from a spool supply 50 that may be located outside of chamber 30 and/or system 10. Film 48 preferably exhibits good bond strengths to support structure 24, allowing support structure 24 to anchor 3D part 22 to reduce the effects of curling. For example, film 48 may be fabricated from one or more materials, such as polycarbonate, acrylic/alkyl acrylic, paper-based, polyester, cellulose, polyamide and/or polyolefin materials, and may be a multi-layer film.

In comparison to platen assembly 32, in the shown embodiment, removal assembly 34 is secured to the front end of chamber 30, adjacent to door assembly 36. As such, the movement of platen assembly 32 along the vertical z-axis engages and disengages platen assembly 32 to and from removal assembly 34, as discussed below. In an alternative embodiment, removal assembly 34 may be secured to the front end of platen assembly 32, allowing removal assembly 34 to move along the vertical z-axis with platen assembly 32. However, removal assembly 34 and spool supply 50 are preferably separate from platen assembly 32, thereby reducing the weight of platen assembly 32, and fixed relative to chamber 30.

Head carriage 38 is a unit configured to receive one or more removable print heads, such as print heads 18, and is supported by head gantry 40. Examples of suitable devices for head carriage 38, and techniques for retaining print heads 18 in head carriage 38, include those disclosed in Swanson et al., U.S. Publication Nos. 2010/0283172 and 2012/0164256.

As mentioned above, in some embodiments, guide tube 16 and/or print head 18 may be components of system 10, rather than subcomponents of consumable assemblies 12. In these embodiments, additional examples of suitable devices for print heads 18, and the connections between print heads 18 and head gantry 40 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182. Moreover, in alternative embodiments, print heads 18 may utilize different deposition-based additive manufacturing techniques. For example, print heads 18 may be inkjet-based print heads, each having one or more arrays of inkjet orifices to print 3D part 22 and support structure 24.

In the shown embodiment, head gantry 40 is a belt-driven gantry assembly configured to move head carriage 38 (and the retained print heads 18) in (or substantially in) a horizontal x-y plane above chamber 30, and is powered by x-y motors 44. Examples of suitable gantry assemblies for head gantry 40 include those disclosed in Comb et al., U.S. patent Ser. No. 13/242,561.

In an alternative embodiment, platen assembly 32 may be configured to move in the horizontal x-y plane within chamber 30, and head carriage 38 (and print heads 18) may be configured to move along the z-axis. Other similar arrangements may also be used such that one or both of platen assembly 32 and print heads 18 are moveable relative to each other. Platen assembly 32 and head carriage 38 (and print heads 18) may also be oriented along different axes. For example, platen assembly 32 may be oriented vertically and print heads 18 may print 3D part 22 and support structure 24 along the x-axis or the y-axis.

As further shown in FIG. 1, system 10 may also include a pair of sensor assemblies 52, which, in the shown embodiment, are located adjacent to bays 28. Sensor assemblies 52 are configured to receive and retain guide tubes 16, while also providing sufficient ranges of movement for guide tubes 16 and print heads 18. Sensor assemblies 52 are also configured to read encoded markings from successive segments of the consumable filaments moving through guide tubes 16. Examples of suitable devices for sensor assemblies 52 include those disclosed in Batchelder et al., U.S. Patent Application Publication Nos. 2011/0117268, 2011/0121476, and 2011/0233804.

System 10 also includes controller 54, which is one or more control circuits configured to monitor and operate the components of system 10. For example, one or more of the control functions performed by controller 54 can be implemented in hardware, software, firmware, and the like, or a combination thereof. Controller 54 may communicate over communication line 56 with print heads 18, chamber 30 (e.g., with a heating unit for chamber 30), removal assembly 34, door assembly 36, head carriage 38, motors 42 and 44, sensor assemblies 54, and various sensors, calibration devices, display devices, and/or user input devices. In some embodiments, controller 54 may also communicate with one or more of bays 28, platen assembly 32, head gantry 40, and any other suitable component of system 10. In further embodiments, controller 54 may also direct the operation of platen assembly 32, removal assembly 34 and/or door assembly 36 based on information received from other components of system 10, such as from sensor assemblies 54.

While illustrated as a single signal line, communication line 56 may include one or more electrical, optical, and/or wireless signal lines, allowing controller 54 to communicate with various components of system 10. Furthermore, while illustrated outside of system 10, controller 54 and communication line 56 may be internal components to system 10. System 10 and/or controller 54 may also communicate with one or more computer-based systems (not shown), which may include computer-based hardware, such as data storage devices, processors, memory modules and the like for generating, storing, and transmitting tool path and related printing instructions to system 10.

System 10 is also shown in use with bucket 58 retained by casing 26 adjacent to door assembly 36. Bucket 58 is a receptacle configured to receive the printed 3D part 22 and support structure 24 when removed from system 10. As discussed below, after 3D part 22 and support structure 24 are printed, removal system 34 preferably draws film 48 until the segment of film 48 retaining the printed 3D part 22 and support structure 24 passes removal assembly 34 and extends through the opening of door assembly 36. Removal system 34 then cuts film 48, allowing the printed 3D part 22 and support structure 24 to fall into bucket 58. In some embodiments, bucket 58 may be lined with one or more cushioning materials to reduce any impact that 3D part 22 and support structure 24 may be subjected to when removed from system 10.

In alternative embodiments, bucket 58 may be replaced by other suitable devices for receiving the removed 3D part 22 and support structure 24. For example, bucket 58 may be replaced with a support removal system (not shown), which may optionally communicate with controller 54 and/or the host computer. In this embodiment, 3D part 22 and support structure 24 may drop out of chamber 30 and into the support removal system to remove support structure 24 from 3D part 22, also preferably in an automated manner. Examples of suitable support removal systems include those disclosed in Swanson et al., U.S. patent application Ser. No. 13/241,454; and Dunn et al., U.S. Publication No. 2011/0186081.

In a further alternative embodiment, bucket 58 may be replaced with a conveyor mechanism, where the removed 3D part 22 and support structure 24 may drop onto a conveyor belt, which transports the received 3D part 22 and support structure 24 to a desired location away from system 10. This is suitable for use with a printing farm of systems 10, such as printing farm 10f shown in FIG. 1, where a network of conveyor belts may transport the 3D parts and support structures from the individual systems 10 to one or more locations for further processing (e.g., support removal).

Figure 3:
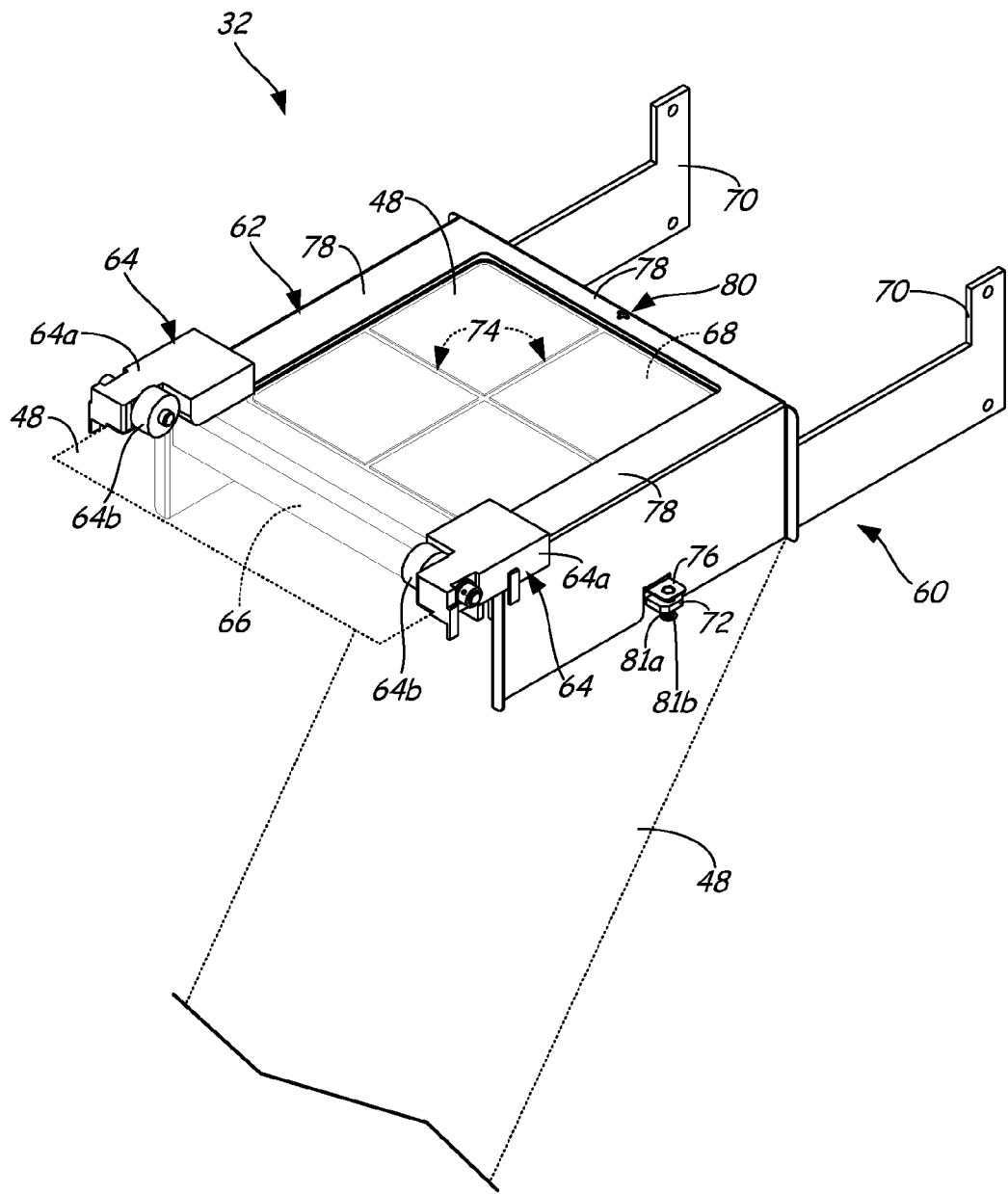
FIG. 3 is a top, right isometric view of a platform assembly of the system in use with a film.
Figure 4:
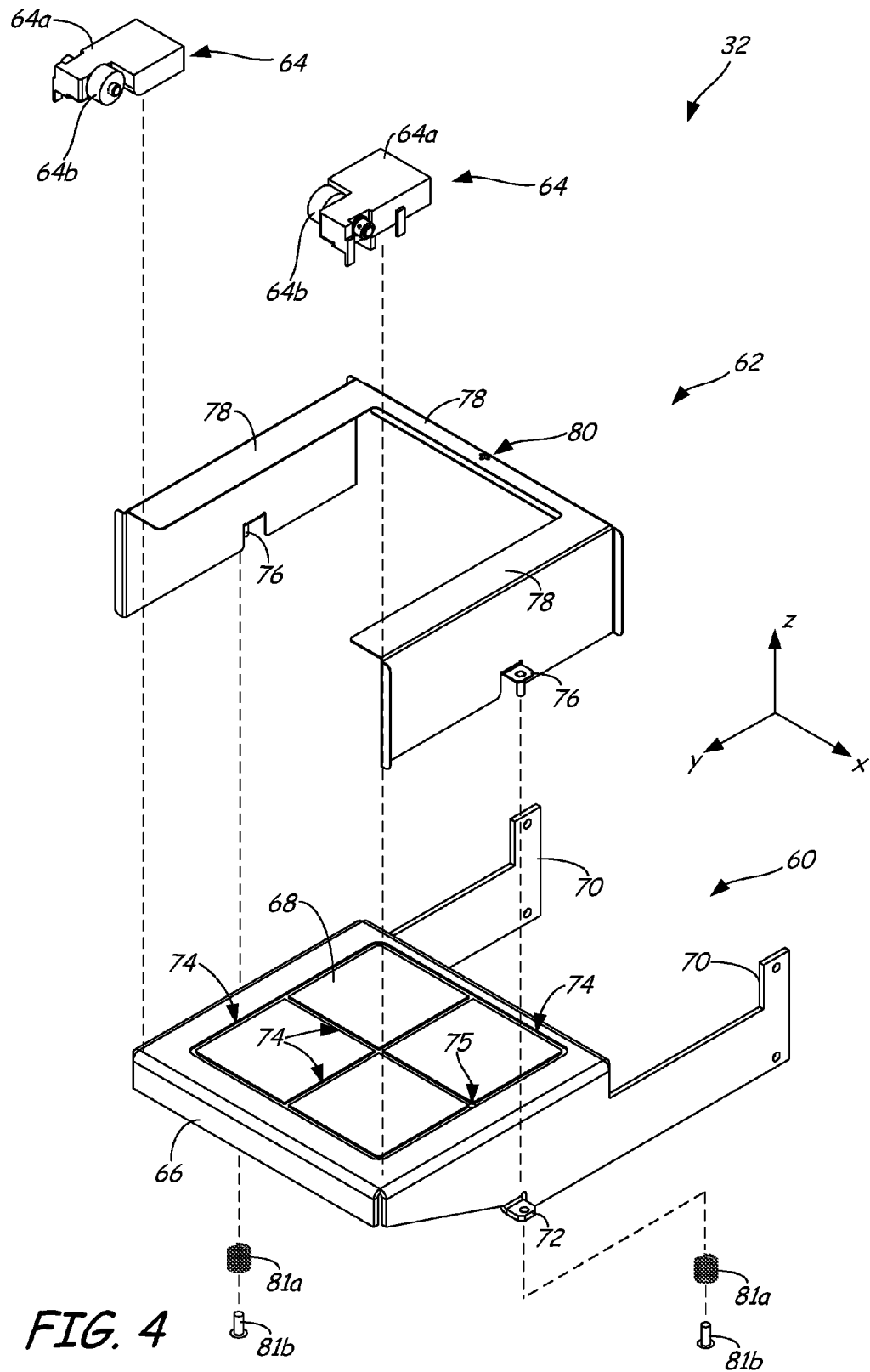
FIG. 4 is an exploded isometric view of the platform assembly.

FIGS. 3-10 illustrate example embodiments for platen assembly 32 and removal assembly 34. As shown in FIGS. 3 and 4, platen assembly 32 includes vacuum platen 60, retention bracket 62, and wheel units 64, each of which may be fabricated from one or more metallic and/or thermally-stable polymeric materials. Vacuum platen 60 includes platform portion 66 (having top surface 68 located below film 48), arm extensions 70, and a pair of bias tabs 72. Top surface 68 includes indentations 74 and vacuum hole 75 (shown in FIG. 4) for drawing a vacuum across top surface 68. The drawn vacuum holds film 48 down against top surface 68 during printing operations, preventing film 48 from shifting while 3D part 22 and support structure 24 are printed. Restraining film 48 in this manner allows support structure 24 to effectively anchor the layers of 3D part 22, thereby reducing curling effects on 3D part 22.

Arm extensions 70 extend from the rear side of platform portion 66, and protrude through slits in a rear wall of chamber 30 (e.g., rear wall 176, shown below in FIGS. 14A-14G) to engage the platen gantry (e.g., platen gantry 174, shown below in FIGS. 14A-14G) of system 10 outside of chamber 30. This engagement allows the platen gantry to move platen assembly 32 along the vertical z-axis within chamber 30. Wheel units 64 each include mounting blocks 64a and idler wheels 64b rotatably secured to mounting blocks 64a, where idler wheels 64b may include rubber-coated surfaces, if desired. Mounting blocks 64a are accordingly mounted to the front end of platform portion 66 at top surface 68.

Retention bracket 62 is a U-shaped bracket that covers the periphery of top surface 68, thereby exposing film 48 at top surface 68. Retention bracket 62 includes a pair of bias tabs 76, lateral edges 78, and calibration target 80. Bias tabs 72 and 76 align are aligned and retain springs 81a and bolts 81b or other biasing mechanisms that compress or otherwise bias lateral edges 78 of retention bracket 62 downward against top surface 68. This also assists in restraining film 48, in addition to the drawn vacuum, where the edges of film 48 are pressed between top surface 68 and lateral edges 78. Calibration target 80 is one or more markings suitable for calibrating print heads 18, such as disclosed in Leavitt et al., U.S. patent application Ser. No. 13/422,343.

Figure 5:
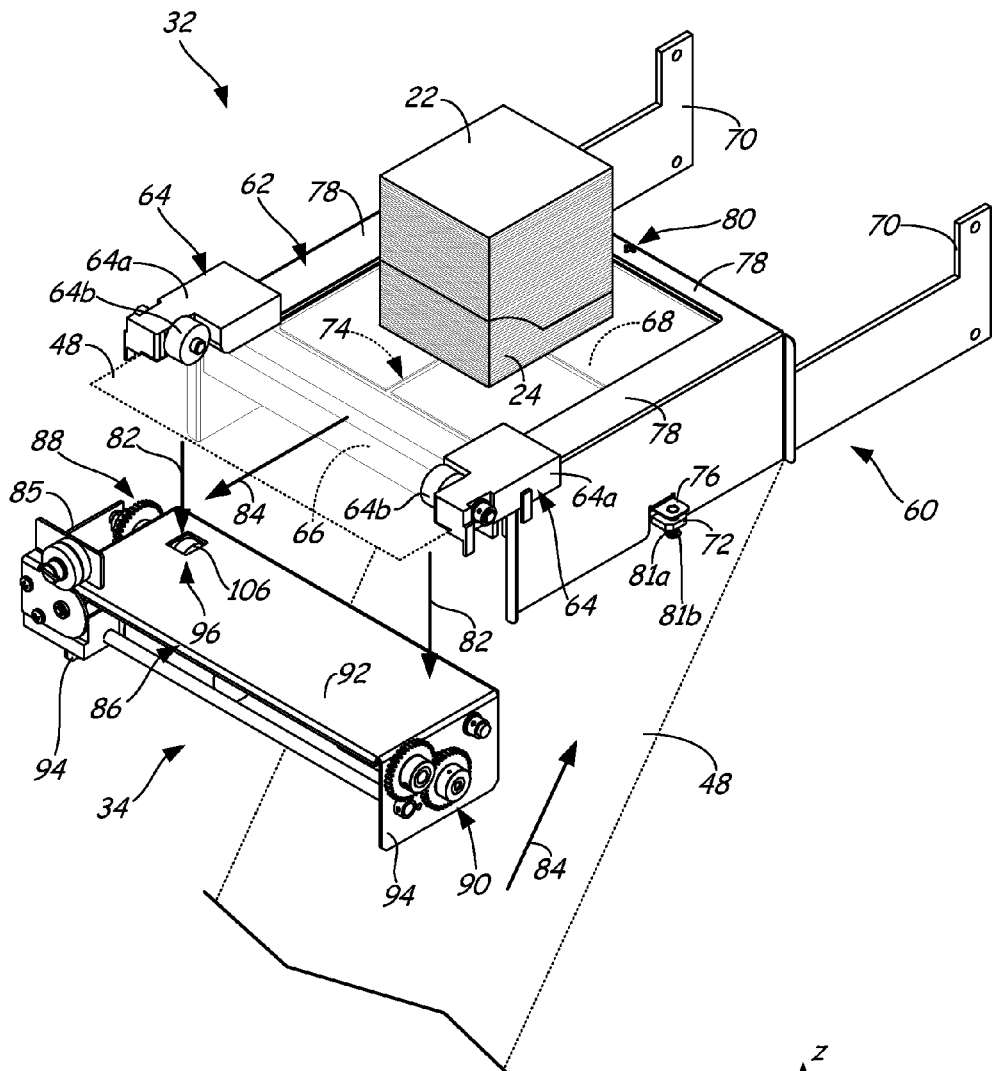
FIG. 5 is a top, right isometric view of the platform assembly and a removal assembly of the system in use with a film.

As shown in FIG. 5, during a printing operation, print heads 18 may print 3D part 22 and support structure 24 in a layer-by-layer manner onto the segment of film 48 restrained against top surface 68. When the printing operation is completed, platen assembly 32 may be lowered down along the vertical z-axis to engage removal assembly 34, as illustrated by arrows 82.

Retention bracket 62 may then disengage from platform portion 66 and the drawn vacuum may be halted. This releases film 48 from top surface 68. Removal assembly 34 may then draw film 48 (and the printed 3D part 22 and support structure 24) in the direction of arrows 84 until the segment of film 48 that retains the printed 3D part 22 and support structure 24 moves past the front end of removal assembly 34. As discussed further below, removal assembly 34 may then cut film 48, allowing the printed 3D part 22 and support structure 24 to drop out of chamber 30 and into bucket 58 (or other suitable receptacle or conveyor mechanism).

As shown in FIGS. 5 and 6, removal assembly 34 includes circuit board 85, frame portion 86, film drive mechanism 88, and cutting mechanism 90, where frame portion 86, film drive mechanism 88, and cutting mechanism 90 may each be fabricated from one or more metallic and/or thermally-stable polymeric materials. Circuit board 85 is one or more electronic circuits supported by frame portion 86 and preferably communicates with controller 54 (via communication line 56) to operate film drive mechanism 88 and cutting mechanism 90.

Frame portion 86 includes top surface 92 and lateral flanges 94, where top surface 92 includes roller port 96. Top surface 92 preferably aligns in the x-y plane with top surface 68 of platform portion 66 when platform assembly 32 engages removal assembly 34.

Figure 8:
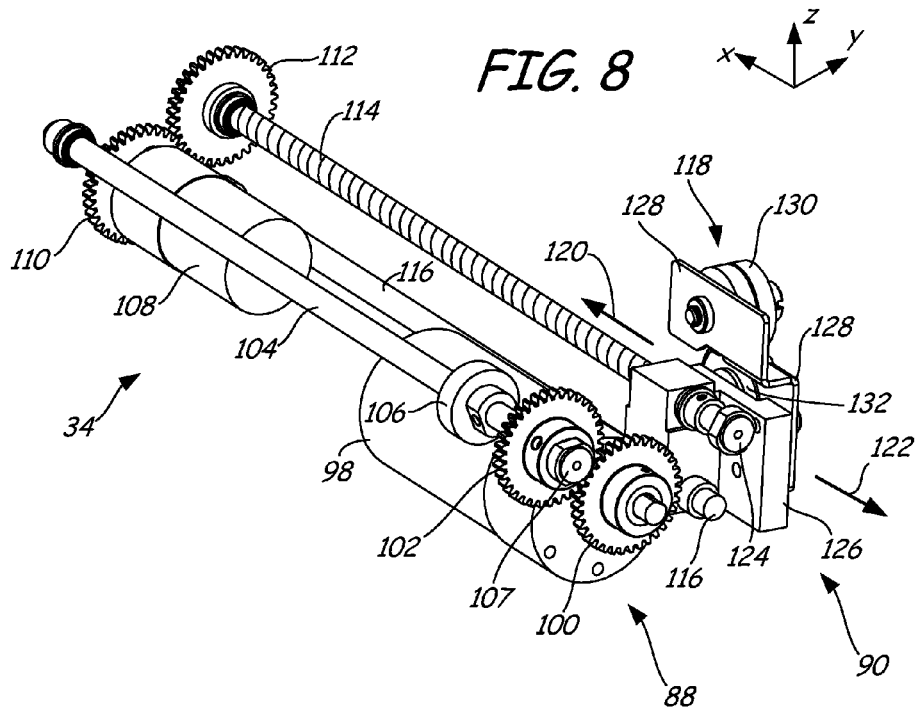
FIG. 8 is a top, left isometric view of the subcomponents of the removal assembly.

FIGS. 7 and 8 further illustrate film drive mechanism 88 and cutting mechanism 90 with frame portion 84 and circuit board 85 omitted, where FIG. 7 is the same isometric view as shown in FIG. 6, and FIG. 8 is the opposing isometric view from that shown in FIGS. 6 and 7. As shown, film drive mechanism 88 includes motor 98, drive gears 100 and 102, drive shaft 104, and drive roller 106. Motor 98 is an electric motor configured provide rotational power to drive gear 100, where drive gear 100 is axially connected to motor 98 and is supported by one of flanges 94 (shown in FIG. 6).

Drive gear 102 is rotatably engaged with drive gear 100 and axially connected to drive shaft 104, where the ends of drive shaft 104 are supported by flanges 94. This arrangement allows the rotational power of motor 98 to rotate drive shaft 104 and drive roller 106, where drive roller 106 is axially connected to drive shaft 104, and extends through port 96 of top surface 90 (as shown in FIGS. 5 and 6). Drive roller 106 may also include surface features, such as a knurled surface.

When platen assembly 32 lowers down and engages removal assembly 34, the leading end of film 48 is nipped between the left-side idler wheel 64b and drive roller 106. This allows the rotation of drive roller 106 to draw film 48 (and the printed 3D part 22 and support structure 24) in the direction of arrow 84. The right-side idler wheel 64b may nip film 48 against top surface 92 to keep film 48 aligned while being drawn. In an alternative embodiment, film drive mechanism 88 may include a second drive roller 106 (not shown) aligned with the right-side idler wheel 64b, and extending through a second port 96 (not shown) in top surface 92, to assist in driving film 48 in the direction of arrow 84.

Additionally, drive shaft 104 may include encoder magnet 107, which is readable by a reciprocating encoder reader on circuit board 85 (shown in FIG. 6) to allow controller 54 to monitor the rotation of drive wheel 106, and hence, the rate and distance that film 48 is drawn. As such, controller 54 may direct motor 98 to operate to draw film 48 in the direction of arrow 84 for a predefined length (based on the number of rotations of drive shaft 104), which preferably corresponds to the distance at which 3D part 22 and support structure 24 move sufficiently past top surface 92 of removal assembly 34.

Cutting mechanism 90 extends generally parallel to film drive mechanism 88, and includes motor 108, drive gears 110 and 112, power or translation screw 114, linear bearing 116, and blade unit 118. Motor 108 is a second electric motor configured provide rotational power to drive gear 110, where drive gear 110 is axially connected to motor 108 and is supported by one of flanges 94 (shown in FIG. 6). Drive gear 112 is rotatably engaged with drive gear 110 and axially connected to power screw 114, where the ends of power screw 114 and linear bearing 116 are also supported by flanges 94.

Blade unit 118 is threadedly engaged with power screw 114 and slidably engaged with linear bearing 116, which allows blade unit 118 to move along the x-axis based on the rotational power of motor 108. For example, blade unit 118 may be pulled along the x-axis in the direction of arrow 120 when motor 114 rotates power screw 114 in a first rotational direction (i.e., to cut film 48), and may be retracted along the x-axis in the direction of arrow 122 when motor 108 rotates power screw 114 in a second and opposing rotational direction.

Additionally, power screw 114 may include encoder magnet 124 (shown in FIG. 8), which is readable by a second reciprocating encoder reader on circuit board 85 (shown in FIG. 6) to allow controller 54 to monitor the rotation of power screw 114. This allows controller 54 to direct the movement of blade unit 118 in the directions of arrows 120 and 122.

Blade unit 118 includes slide block 126, blade shield 128, backing roller 130, and rotary blade 132 (shown in FIG. 8). Slide block 126 is the portion of blade unit 118 that is engaged with threaded screw 114 and linear bearing 116 for moving blade unit 118 along the x-axis in the directions of arrows 120 and 122. Shield guard 128 is a bracket that is secured to slide block 126 (e.g., with bolts 133 or other fasters), rotatably supports backing roller 130 and rotary blade 132, and functions as a safety shield to prevent users from coming into contact with rotary blade 132.

Figure 9:
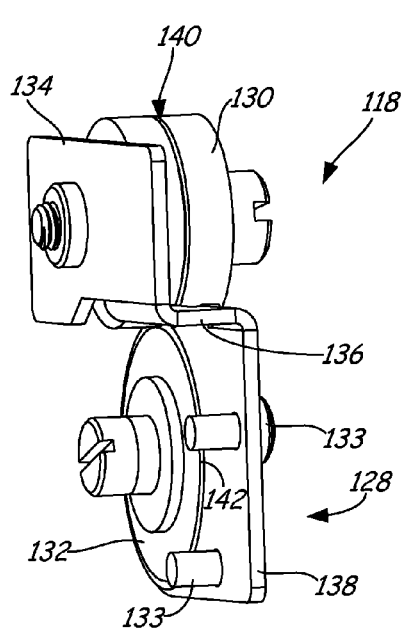
FIG. 9 is an expanded perspective view of subcomponents of a cutting unit of the removal assembly.
Figure 10:
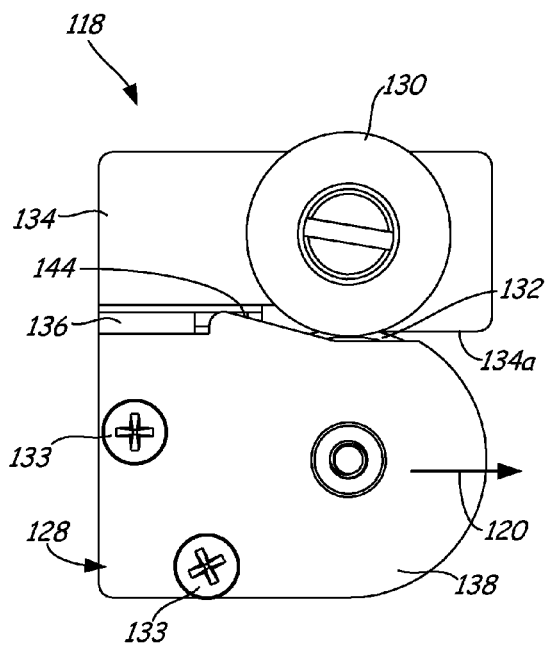
FIG. 10 is a front view of the subcomponents of the cutting unit.

FIGS. 9 and 10 further illustrate the engagements between shield guard 128, backing roller 130, and rotary blade 132. As shown, shield guard 128 includes upper section 134, step-over section 136, and lower section 138, where step-over section 136 interconnects upper section 134 and lower section 136. Backing roller 130 is rotatably mounted to upper section 134 to freely rotate, and extends adjacent to step-over section 136 to engage rotary blade 132. In particular, backing roller 130 includes annular groove 140, which is configured to receive a peripheral edge 142 of rotary blade 132. Backing roller 130 may be fabricated from one or more metallic, thermoplastic, and/or hard rubber materials.

Rotary blade 132 is rotatably mounted to lower section 138 to freely rotate, where lower section 138 includes ramp 144 (shown in FIG. 10) to lift film 48 during a cutting operation. For example, film 48 may be cut by pulling blade unit 118 in the direction of arrow 120, as discussed above. This causes film 48 to engage peripheral edge 142 of rotary blade 132 and annular groove 140 of backing roller 130 between upper section 134 and lower section 138, where upper section 134 includes a leading edge 134a for properly positioning film 48. Film 48 is also lifted at ramp 144 to increase the ease of cutting.

The continued movement of blade unit 118 in the direction of arrow 120 rotates rotary blade 132 and backing roller 130 against film 48, thereby cutting film 48 along the front end of removal assembly 34. As discussed above, the cut segment of film 48 retaining 3D part 22 and support structure 24 may then drop out of chamber 30 through door assembly 36, and into bucket 58 (or other suitable receptacle or conveyor mechanism).

Figure 11:
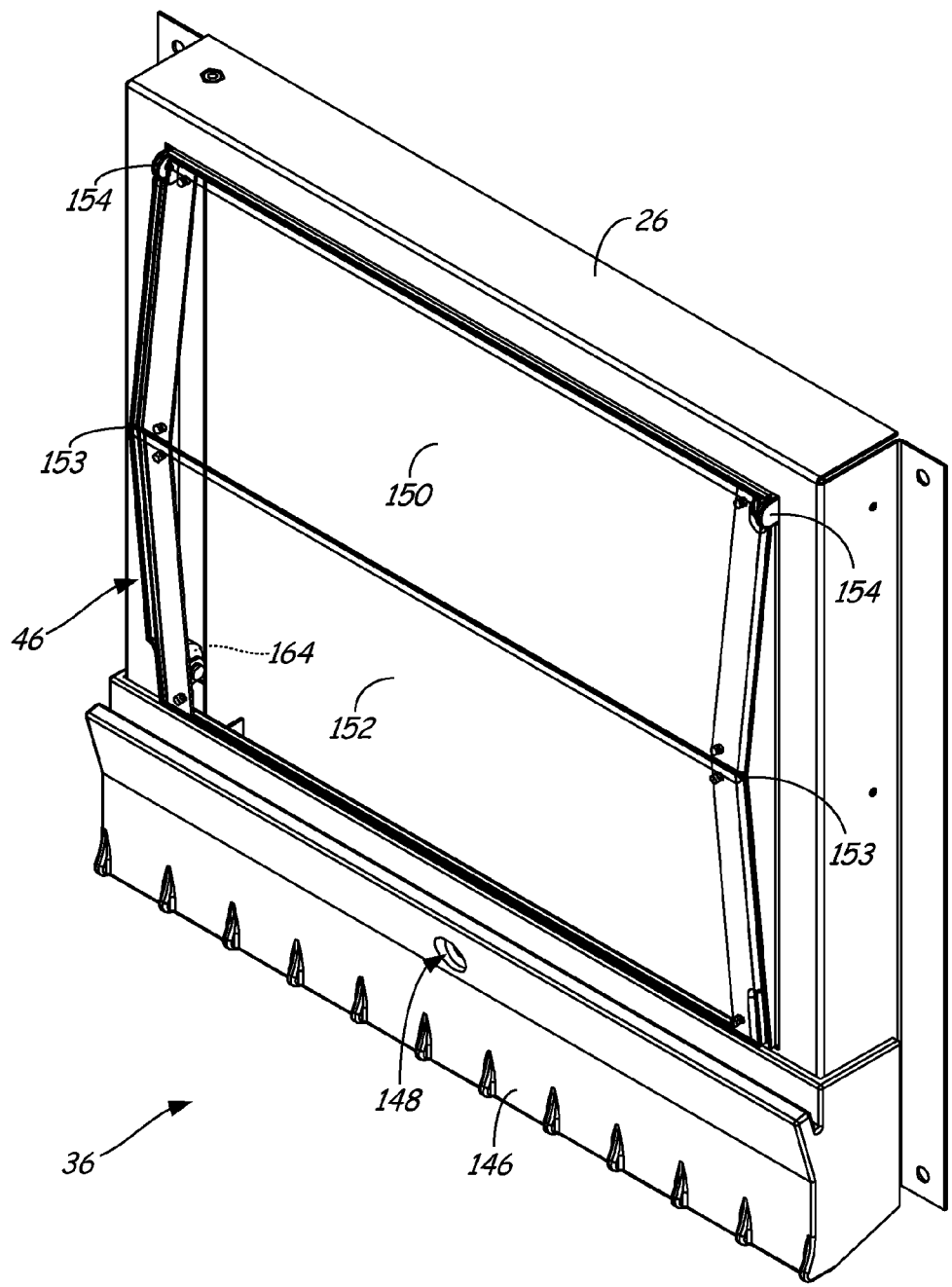
FIG. 11 is a top, right isometric view of a door assembly of the system.
Figure 12:
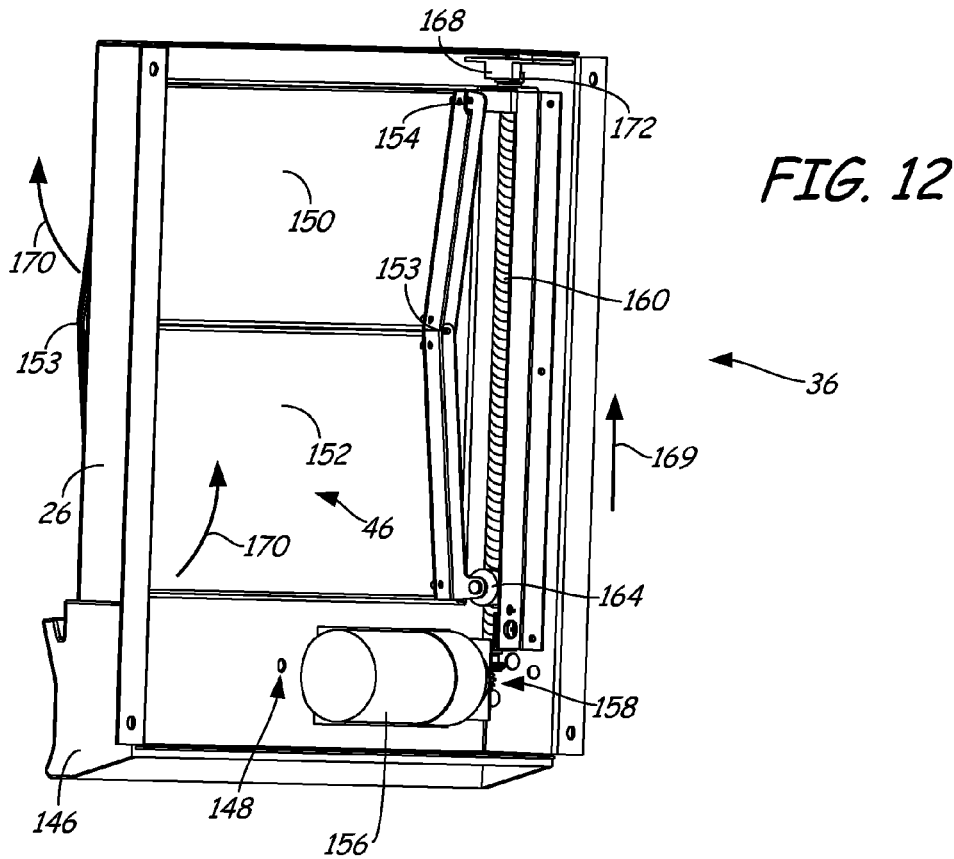
FIG. 12 is a bottom, left isometric view of the door assembly.
Figure 13:
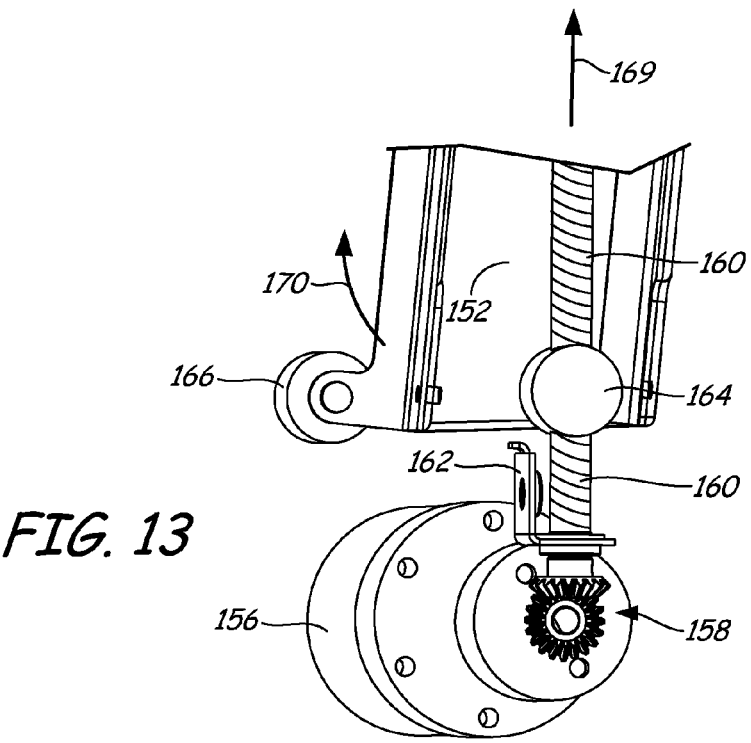
FIG. 13 is an expanded view of a drive mechanism of the door assembly.

FIGS. 11-13 illustrate a suitable embodiment for door assembly 36. As shown in FIG. 11, in addition to bi-fold door 46, door assembly 36 also includes base cover 146 having opening 148 for retaining a bucket bracket (for supporting bucket 58 as shown in FIG. 1). In the shown embodiment, bi-fold door 46 includes upper panel 150 and lower panel 152, which are hingedly connected together at hinged joints 153. Upper panel 150 is also hingedly connected to casing 26 at the inlet of chamber 30 with hinged joints 154.

As shown in FIGS. 12 and 13, door assembly 36 also includes motor 156, miter gears 158, power or translational screw 160, bracket 162 (shown in FIG. 13), threaded nut 164, roller or slider 166 (shown in FIG. 13), and circuit board 168, where threaded nut 164 and roller 166 are secured to opposing bottom corners of lower panel 152. Motor 156 is an electric motor secured to base cover 146 and configured to rotate miter gears 158. Miter gears 158 accordingly inter-engage motor 156 and power screw 160 for rotating power screw 160. The ends of power screw 160 are supported by casing 26 and bracket 162, where bracket 162 is accordingly secured to casing 26.

Threaded nut 164 is threadedly engaged with power screw 160, which allows threaded nut 164 to move along the z-axis based on the rotational power of motor 156, which accordingly pulls lower panel 152 of bi-fold door 46 along the z-axis to open and close bi-fold door 46. For example, threaded nut 164 may be pulled along the z-axis in the direction of arrow 169 when motor 156 rotates power screw 160 in a first rotational direction. This accordingly raises lower panel 152 and upper panel 150 around hinged joints 153 and 154, as illustrated by arrows 170, to open bi-fold door 46 to an open state as shown above in FIG. 1. Roller 166 correspondingly rolls along a reciprocating tack in casing 26 to maintain even lifting pressures laterally across lower panel 152. Bi-fold door 46 may also be closed by having motor 156 rotate power screw 160 in a second and opposing rotational direction, which pulls threaded nut 164 and lower panel 152 downward along the z-axis (opposite directions from arrows 169 and 170).

Power screw 160 may include encoder magnet 172 (shown in FIG. 12), which is readable by a reciprocating encoder reader on circuit board 168 to allow controller 54 to monitor the rotation of power screw 160. This allows controller 54 to direct the opening and closing of bi-fold door 46 in an automated manner.

The above-discussed embodiments of removal assembly 34 and door assembly 36 are depicted with their electronic components (e.g., circuit boards 85 and 168, and motors 98, 108, and 156 being located inside of chamber 30. In some embodiments, these components are preferably located outside of chamber 30, and respectively engage film drive mechanism 88, cutting mechanism 90, and bi-fold door 46 through the walls of chamber 30. These embodiments are particularly suitable when chamber 30 is heated, as discussed above, to protect these components from the elevated temperatures within chamber 30.

Figure 14A:
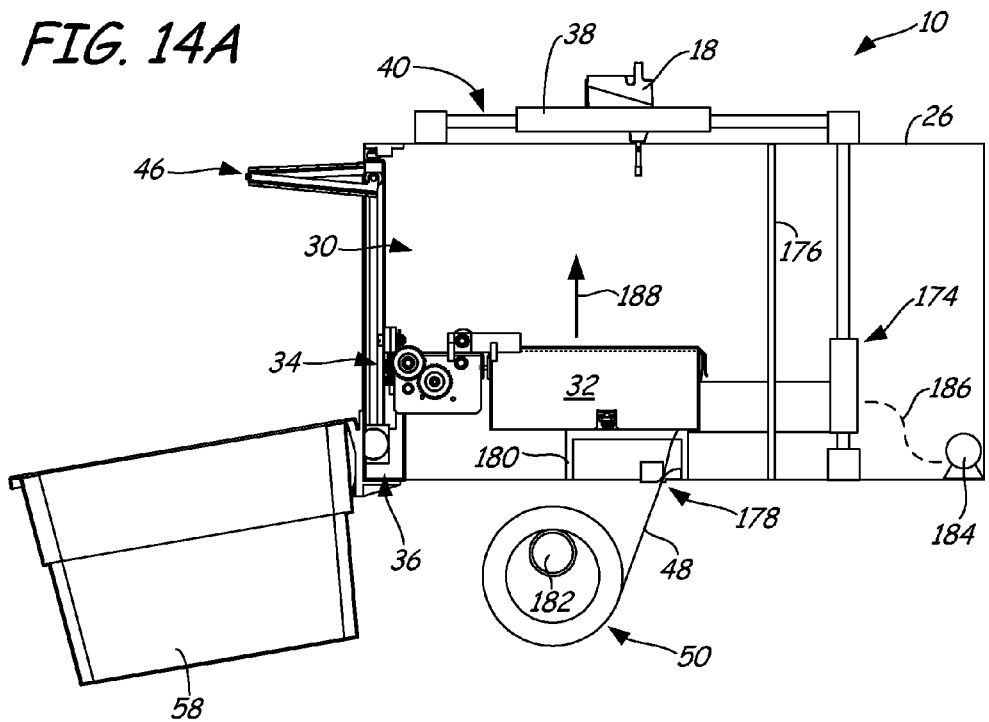

FIGS. 14A-14G depict a process for operating system 10 to print and remove 3D part 22 and support structure 24 in an automated manner. As shown in FIG. 14A, system 10 also includes platen gantry 174 located behind a rear wall 176 of chamber 30, and which is operably engaged with z-axis motor 42 (shown in FIG. 1).

System 10 further includes film inlet port 178 and hard stop 180. Film inlet port 178 is an opening into the floor of chamber 30 through which film 48 travels between spool supply 50 and platen assembly 32. Spool supply 50 is freely suspended below system 10 on support shaft 182, which allows film 48 to freely unwind from spool supply 50. Accordingly, in this embodiment, system 10 may also include a lower frame (not shown) for mounting system 10 above spool supply 50. In alternative embodiments, spool supply 50 may be located within casing 26. In these embodiments, film inlet port 178 may be located at other locations outside of chamber 30. Moreover, in some embodiments, spool supply 50 may be retained entirely within chamber 30, where film inlet port 178 may be omitted. However, spool supply 50 is preferably not retained by platen assembly 32 or platen gantry 174, and also preferably located outside of chamber 30 for ease of access.

Film 48 may be loaded to platen assembly 32 by lowering platen assembly 32 until retention bracket 62 contacts hard stop 180. As discussed above, vacuum platen 60 of platen assembly 32 and retention bracket 62 are preferably biased together. However, upon contacting hard stop 180, retention bracket 62 is pressed upward against the bias by the continued downward movement of vacuum platen 60. For example, controller 54 may direct platen gantry 174 to lower vacuum platen 60 to a suitable height within chamber 30 to separate retention bracket 62 from top surface 68 by a given distance (e.g., by about 0.25 inches).

A leading end of film 48 may then be inserted through film inlet port 178 and into the space between the disengaged retention bracket 62 and top surface 68 of platform portion 66 (of vacuum platen 60). In the shown embodiment, system 10 also includes vacuum pump 184 and vacuum line 186, where vacuum line 186 is connected to platform portion 66 at vacuum hole 75 (shown in FIG. 4) and to vacuum pump 184 for drawing a vacuum at top surface 68. Accordingly, after film 48 is inserted between retention bracket 62 and top surface 68, controller 54 may direct vacuum pump 184 to draw a vacuum at top surface 68, which holds film 48 down against top surface 68.

Controller 54 may then direct platen gantry 174 to raise platen assembly 32 along the z-axis to a predetermined height within chamber 30, as illustrated by arrow 188. This disengages retention bracket 62 from hard stop 180, allowing lateral edges 78 of retention bracket 62 to press back down against film 48 and top surface 68, thereby further restraining film 48 to top surface 68 (along with the drawn vacuum). Because spool supply 50 freely rotates around support shaft 182, the upward movement of platen assembly 32 unwinds film 48 until platen assembly 32 reaches the desired location at the top of chamber 30.

Figure 14B:
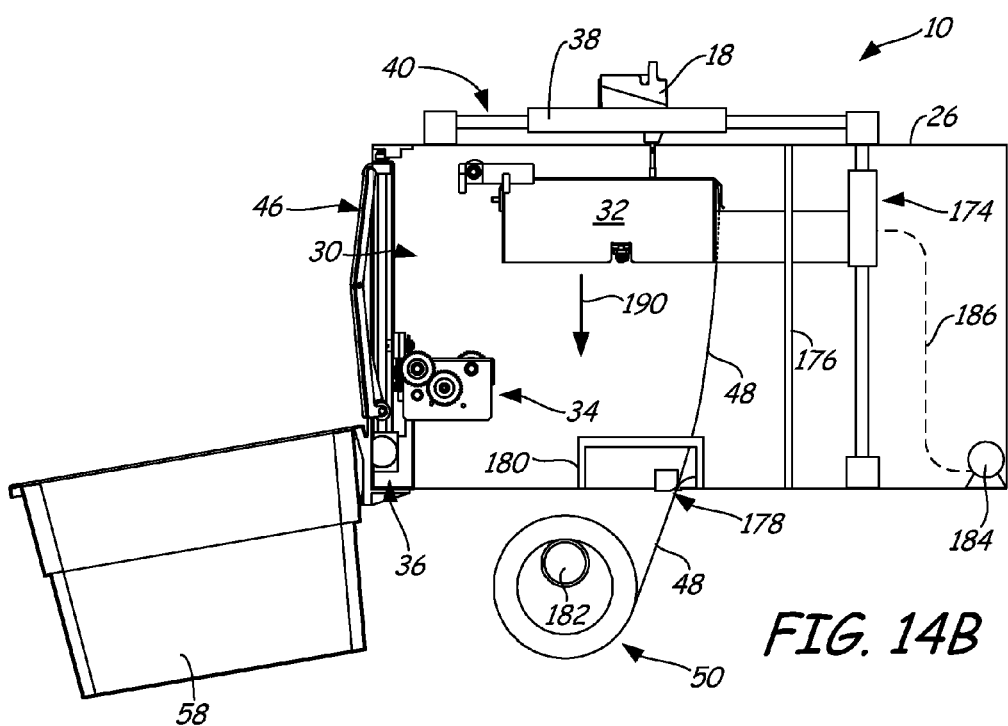

As shown in FIG. 14B, when platen gantry 32 reaches a desired height in chamber 30, controller 54 may then direct motors 44 and head gantry 40 to move head carriage 38 (and the retained print heads 18) around in the horizontal x-y plane above chamber 30. Controller 54 may also direct print heads 18 to selectively draw successive segments of the consumable filaments from container portions 14 and through guide tubes 16, respectively. Each print head 18 thermally melts the successive segments of the received consumable filament such that the filament becomes a molten material. The molten material is then extruded and deposited onto the segment of film 48 retained by platen assembly 32 to print a layer of 3D part 22 and/or support structure 24.

After each layer is printed, platen gantry 174 may lower platen assembly 32 by a single layer increment, as illustrated by arrow 190. As shown in FIG. 14C, as platen assembly 32 continues to incrementally lower, the remaining unwound segment of film 48 may become slack and function as a service loop. In an alternative embodiment, if desired, spool supply 50 may be retained on support shaft 182 in a biased manner that maintains a mild level of tension on film 48 to prevent the formation of any service loops.

As shown in FIG. 14D, after the print operation is complete, controller 54 may then direct platen gantry 174 to lower platen assembly 32 back down to remove 3D part 22 and support structure 24. In particular, platen assembly 32 may be lowered down to contact hard stop 180 again, thereby disengaging and lifting retention bracket 62 from top surface 68. Controller 54 may also direct vacuum pump to stop drawing a vacuum, which releases film 48 from top surface 68. Furthermore, controller 54 may direct motor 156 of door assembly 36 to open bi-fold door 46, as discussed above. If desired, controller 54 may also shut off any blower in chamber 30 to halt the circulation of heated air while bi-fold door 46 is opened.

When platen assembly 32 is in its lowered state and engaged with removal assembly 34, the leading end of film 48 is nipped between the left-side idler wheel 64b and drive roller 106, as discussed above. Controller 54 may then direct motor 98 to rotate drive roller 106 to draw film 48 (and the printed 3D part 22 and support structure 24) in the direction of arrow 84. In the shown example, this also draws film 48 from the slack service loop up to top surface 68 of platform assembly 32 to function as a receiving surface for a subsequent printing operation.

Figure 14E:
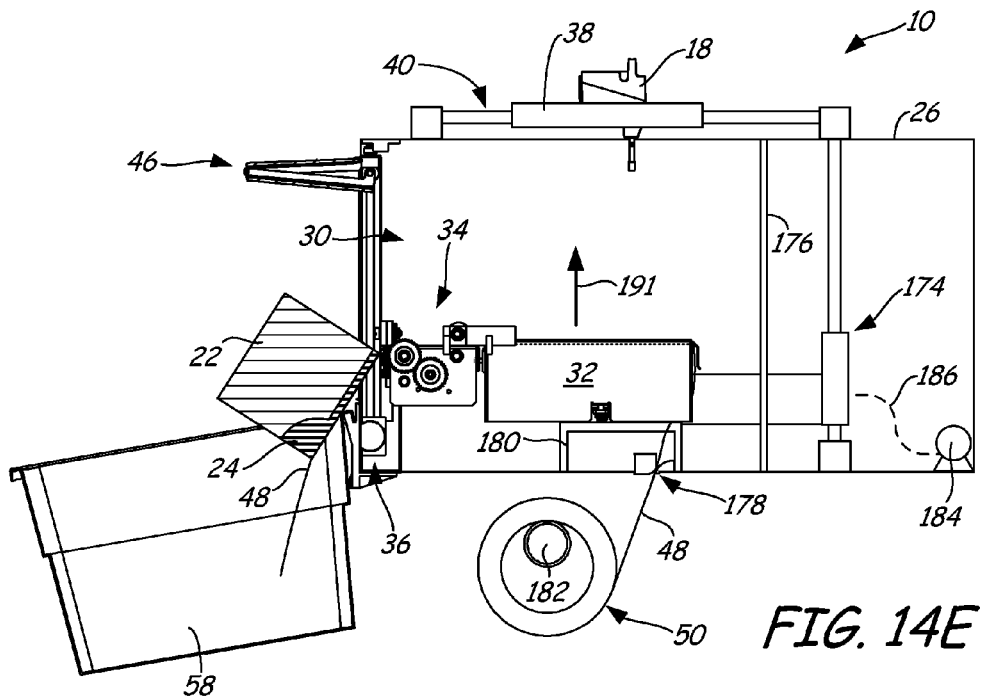

As shown in FIG. 14E, after a predetermined length of film 48 is drawn, preferably such that 3D part 22 and support structure 24 extend through the opened door assembly 36, controller 54 may stop the operation of motor 98, which accordingly stops drawing film 48 in the direction of arrow 84. Controller 54 may then restart vacuum pump 184 to restrain the subsequent segment of film 48 to top surface 68. Controller 54 also preferably directs platen gantry 174 to raise platform assembly 32 by a small increment, as illustrated by arrow 191, to disengage retention bracket 62 from hard stop 180. This allows lateral edges 78 of retention bracket 62 to press back down against film 48 and top surface 68, thereby again restraining film 48 to top surface 68 (along with the drawn vacuum).

Figure 14F:
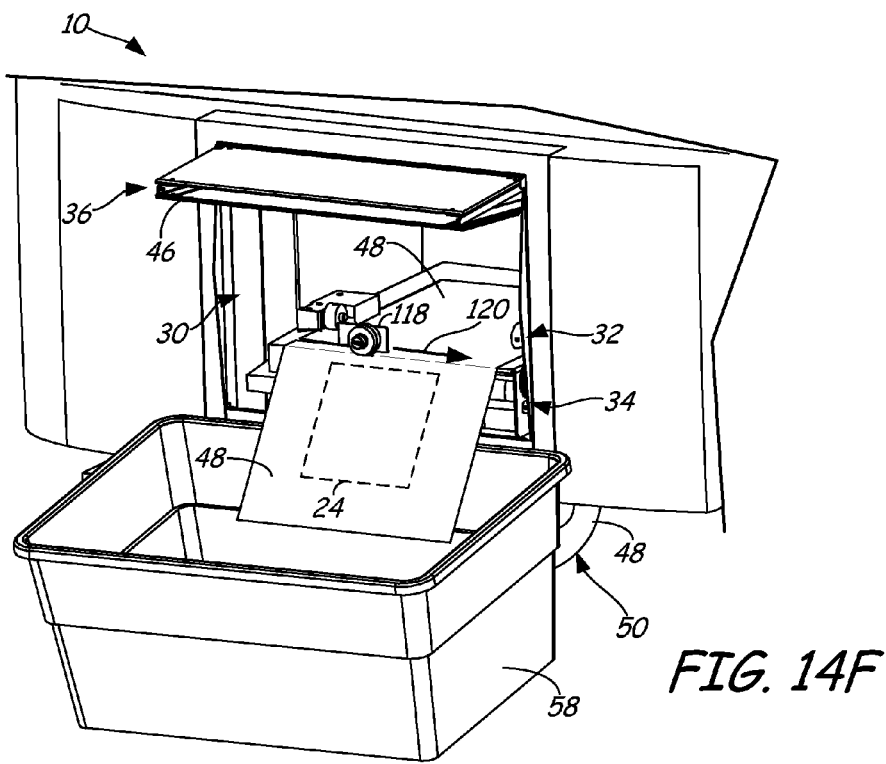

FIG. 14F illustrates a cutting operation with blade unit 118, where 3D part 22 and support structure 24 are depicted by the footprint of support structure 24 for ease of discussion. As shown, controller 54 may then direct motor 108 to draw blade unit 118 across film 48 along the x-axis in the direction of arrow 120. As discussed above, this cuts film 48 at the front end of removal assembly 34, allowing the cut segment of film 48 with the printed 3D part 22 and support structure 24 to fall into bucket 58, as shown in FIG. 14G.

Figure 14G:
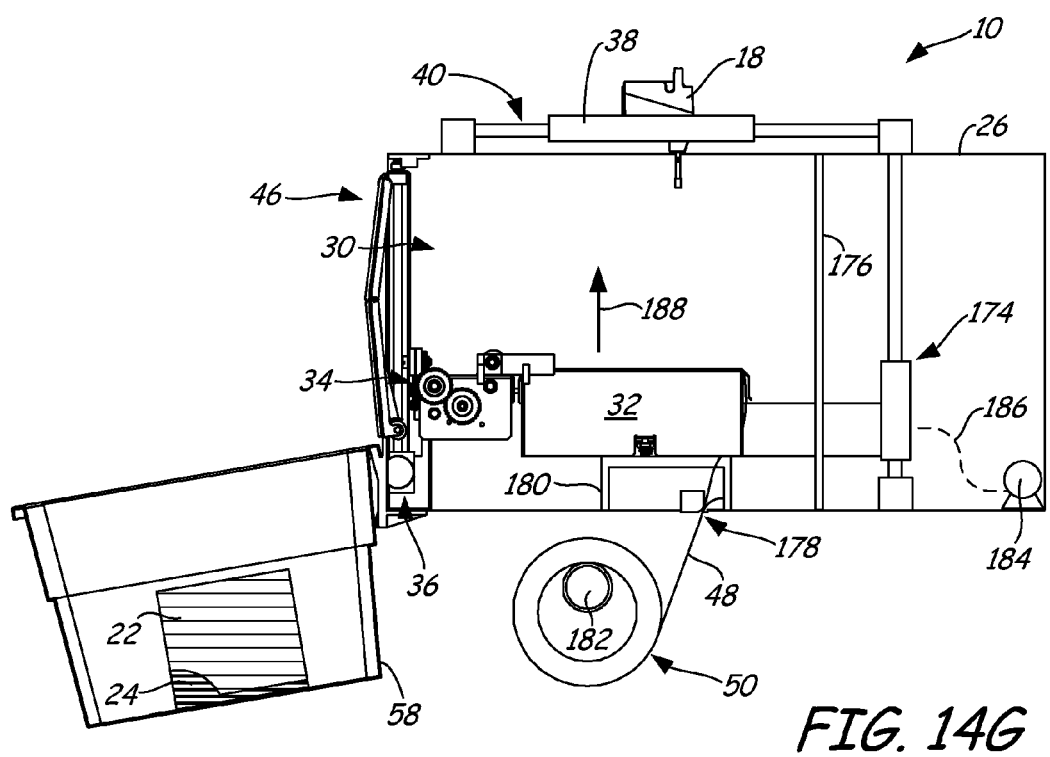

As further shown in FIG. 14G, after the cutting step, controller 54 may direct door assembly 36 to close bi-fold door 46. Controller 54 may also direct blade unit 118 to retract back along the x-axis in the direction of arrow 122. At this point, the subsequent segment of film 48 is restrained by retention bracket 62 and the drawn vacuum. As such, system 10 is ready to begin a subsequent printing operation following the same steps, where platen assembly 32 may be raised back up along the vertical z-axis, as illustrated by arrow 188 and as discussed above.

Accordingly, system 10 is capable of printing and removing multiple successive 3D parts and support structures in an automated manner, preferably without requiring user intervention (other than to change over consumable assemblies 12). This increases the efficiencies of printing operations with system 10, and allows system 10 to operate in an automated printing farm, such as printing farm 10f (shown in FIG. 1).

While system 10 is described above in use with spool supply 50 of film 48, platen assembly 32 may alternatively be configured to operate with film sheets that are separate from each other, or are perforated for separation. In these embodiments, the film sheets may be provided in a stock or other suitable arrangement for delivery to platen assembly 32. For example, system 10 may include a second assembly similar to removal assembly 34, but located at the rear of platen assembly 32 to delivering the film sheets to platen assembly 32.

Figure 15:
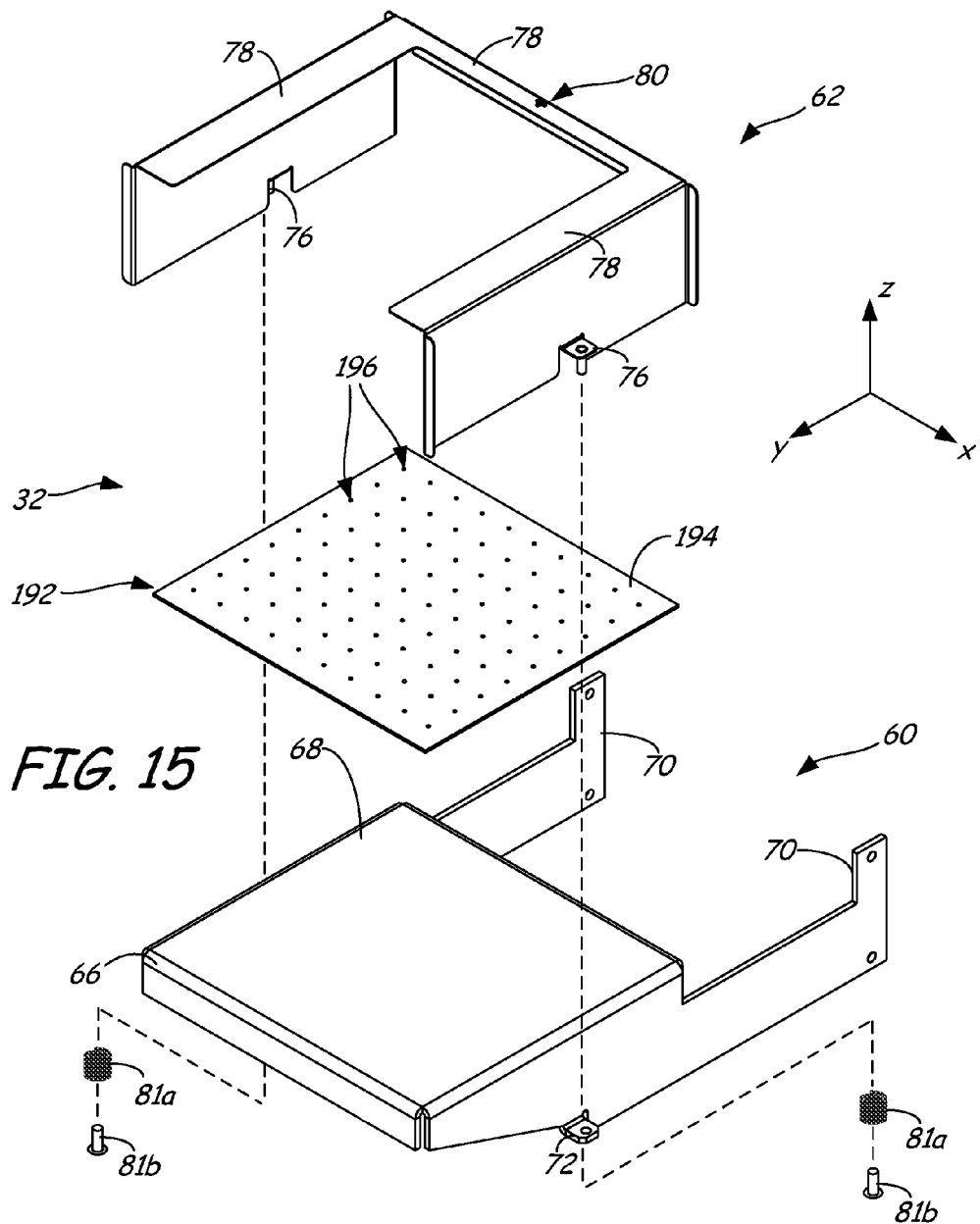
FIG. 15 is an exploded isometric view of a first alternative platform assembly having a substrate with surface holes and a porous interlayer region.

Furthermore, FIGS. 15-21 illustrate alternative embodiments for platen assembly 32, which utilize different types of substrates for printing 3D parts. For example, as shown in FIG. 15 platform assembly 32 may be used with substrate 192 in lieu of film 48. In this embodiment, platform portion 66 may optionally have a planar top surface 68 without indentations 74 or vacuum hole 75, if desired. During use, substrate 192 may be placed on top surface 68 (manually or in an automated manner), and retention bracket 62 may be biased down against platform portion 66 in the same manner as discussed above for film 48. This secures substrate 92 between platform portion 66 and retention bracket 62 for receiving a printed 3D part and support structure.

Substrate 192 is preferably a multi-layer substrate having a porous interlayer region, and may be fabricated from one or more polymeric and/or paper-based materials, and may also include one or more metallic-film layers (e.g., metal foil layers). For example, substrate 192 may be cut from corrugated cardboard to provide a low-cost disposable or recyclable substrate. As further shown in FIG. 15, substrate 192 has top surface 194 for receiving the printed 3D parts and/or support structure, where top surface 194 is perforated with a plurality of holes 196 that extend at least into the porous interlayer region of substrate 192.

Figure 16:
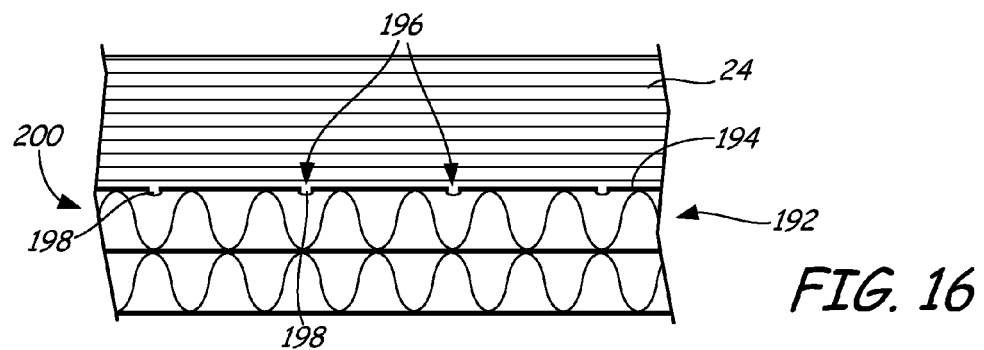
FIG. 16 is a side view of the substrate shown in FIG. 15 with a printed support structure.

As shown in FIG. 16, when a support structure 24 (or 3D part 22) is printed on top surface 194, a portion of the printed material flows into holes 196 in a sprue-like manner, and forms mushroom heads 198 in porous interlayer region 200 upon cooling. This locks support structure 24 to substrate 192, allowing support structure 24 to correspondingly anchor 3D part 22 (e.g., for reducing curling effects). Accordingly, substrate 192 may be fabricated from low-cost materials that otherwise have low adhesion to the part or support materials, such as cardboard or other paper-based materials.

When the printing operation is completed, substrate 192 may be removed from platen assembly 32, and the printed support structure 24 may be removed from holes 196. For example, in embodiments in which substrate 192 is fabricated from corrugated cardboard, the pliable nature of cardboard allows mushroom heads 198 to be pulled out of holes 196 with a moderate amount of pulling force. Alternatively, a cardboard substrate 192 may be readily torn apart from support structure 24. The resulting 3D part 22 and support structure 24 may then be placed in a support removal vessel to remove support structure 24 from 3D part 22. The expended substrate 192 may then be discarded, or more preferably, recycled.

Figure 17:
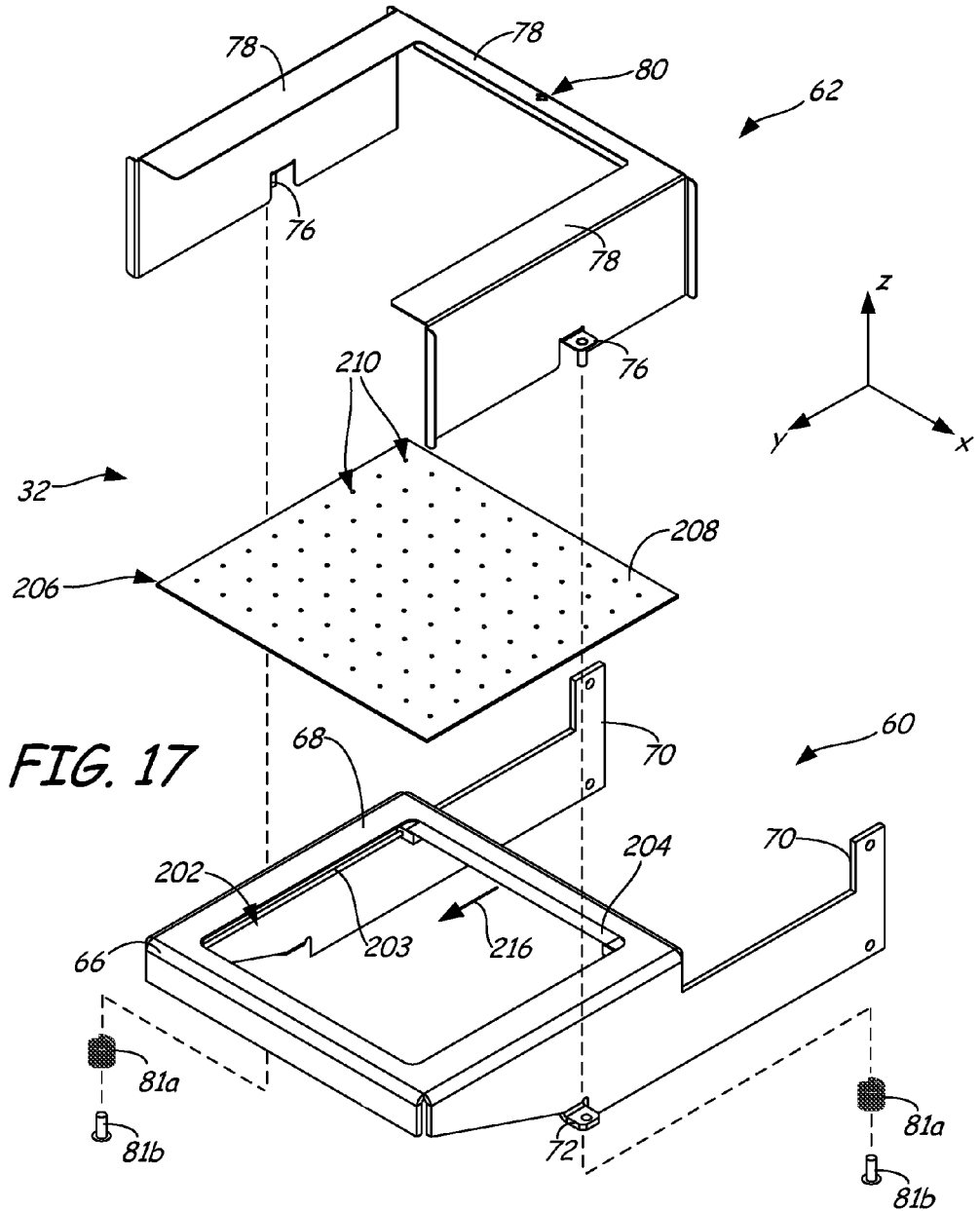
FIG. 17 is an exploded isometric view of a second alternative platform assembly having a substrate with surface holes and a non-porous interlayer region.

In another embodiment, as shown in FIG. 17, top surface 68 of platform portion 66 may be cut away to provide opening 202. Additionally, platen assembly 32 may also include cutting mechanism 203, which is a motor-drive assembly configured to move blade 204 along the y-axis below opening 202 under direction of controller 54. Cutting mechanism 203 may function in a similar manner to cutting mechanism 90 to move blade 204 along the y-axis.

In this embodiment, platen assembly 32 may be used with substrate 206 in a similar manner to substrate 192 (shown in FIGS. 15 and 16). However, substrate 206 is preferably a rigid reusable sheet fabricated from one or more plastic and/or metallic materials. Substrate 206 may be fabricated as one or more layers, but preferably does not include a porous interlayer region. As further shown in FIG. 17, substrate 206 has top surface 208 for receiving the printed 3D parts and/or support structure, where top surface 208 is perforated with a plurality of holes 210, which preferably extend through the entire sheet of substrate 206.

Figure 18:
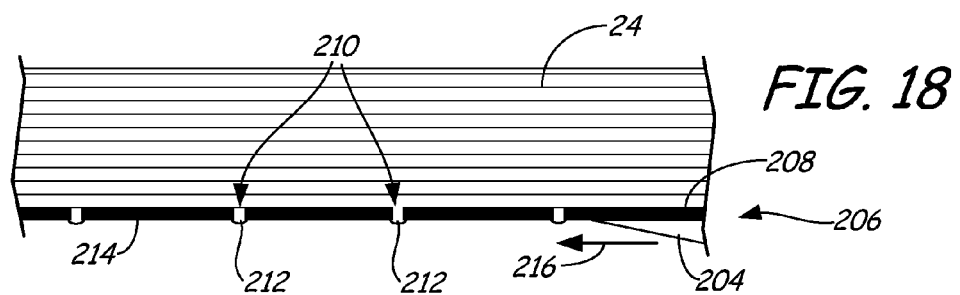
FIG. 18 is a side view of the substrate shown in FIG. 17 with a printed support structure.

As shown in FIG. 18, when a support structure 24 (or 3D part 22) is printed on top surface 208, a portion of the printed material flows into holes 210 in a sprue-like manner, and forms mushroom heads 212 that extend beyond the bottom surface 214 of substrate 206 upon cooling. This locks support structure 24 to substrate 206, allowing support structure 24 to correspondingly anchor 3D part 22 (e.g., for reducing curling effects). As such, substrate 206 may also be fabricated from low-cost materials that otherwise have low adhesion to the part or support materials.

When the printing operation is completed, blade 204 may be driven along the y-axis in the direction of arrow 216. Blade 202 is desirably flush with bottom surface 214 of substrate 206 (through opening 202) when substrate 206 is secured between platform portion 66 and retention bracket 62. As such, the movement of blade 202 cuts mushroom heads 212 apart from the remainder of support structure 24.

Because mushroom heads 212 no longer lock support structure 24 to substrate 206, the printed support structure 24 may be removed from holes 210 with a low pulling force. The resulting 3D part 22 and support structure 24 may then be remove from substrate 206 (and system 10) and then placed in a support removal vessel to remove support structure 24 from 3D part 22. Substrate 206 may then be reused for subsequent printing operations.

Figure 19:
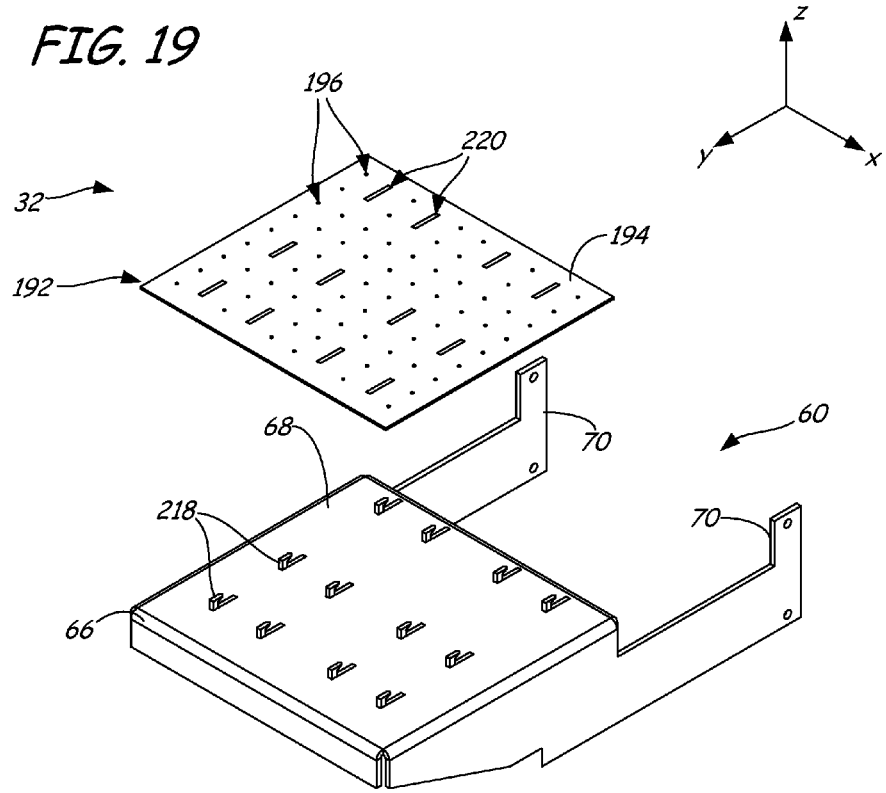
FIG. 19 is an exploded isometric view of a third alternative platform assembly having a substrate with surface holes, a porous interlayer region, and hook slots.
Figure 20:
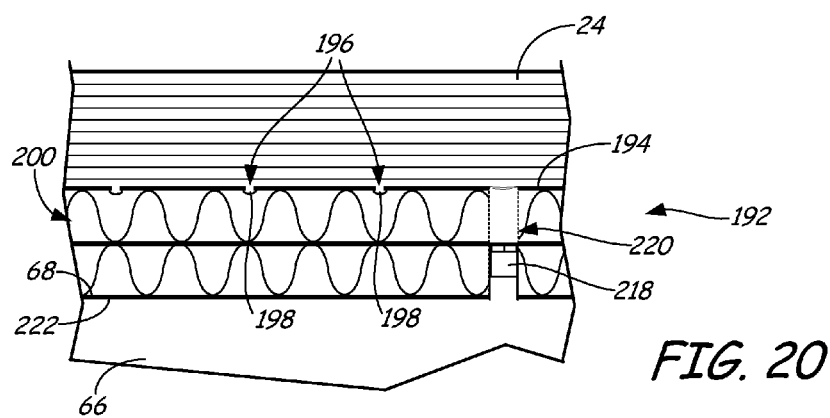
FIG. 20 is a side view of the substrate shown in FIG. 19 with a printed support structure.
Figure 21:
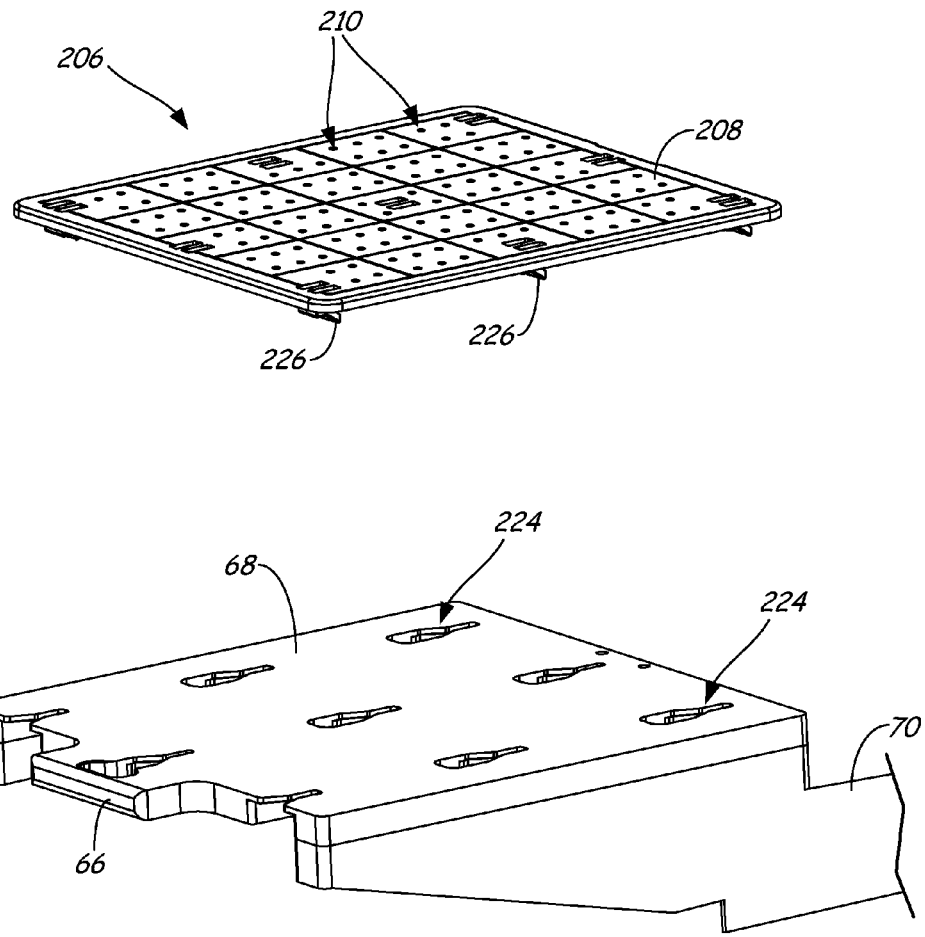
FIG. 21 is an exploded isometric view of a fourth alternative platform assembly having a substrate with surface holes, a non-porous interlayer region, and hook slots.

FIGS. 19-21 illustrate alternative embodiments to substrate 192 (shown in FIGS. 15 and 16) and substrate 206 (shown in FIGS. 17 and 18), which include alternative mechanisms for securing the substrates 192 and 206 to the platform portions 66. In these embodiments, retention bracket 62 may be omitted, if desired. For example, as shown in FIG. 19, platform portion 66 may optionally have a top surface 68 without indentations 74 or vacuum hole 75, but may include hook features 218. In some embodiments, top surface 68 may be provided as a separate plate from platform portion 66, where the separate plate having top surface 68 may be securely retained by platform portion 66.

In this embodiment, substrate 192 is further punched or otherwise perforated with a plurality of hook slots 220 that extend through substrate 192. In some embodiments, hook slots 220 may be punched into substrate 192 from bottom surface 222, but do not extend through top surface 194. However, it is typically easier to manufacture hook slots 220 by punching through the entire body of substrate 192. During use, substrate 192 may be placed on top surface 68 (manually or in an automated manner) such that hook features 218 slide into and securely engage hook slots 220. This secures substrate 192 to platform portion 66 for receiving a printed 3D part and support structure. For example, as shown in FIG. 20, hook features 218 may insert through the bottom surface 222 of substrate 192 and into hook slots 220, such that the tops of hook features 218 reside in porous interlayer region 200.

As further shown in FIG. 20, when a support structure 24 (or 3D part 22) is printed on top surface 194, a portion of the printed material flows into holes 196 in a sprue-like manner, and forms mushroom heads 198 in porous interlayer region 200 upon cooling. This locks support structure 24 to substrate 192, allowing support structure 24 to correspondingly anchor 3D part 22 (e.g., for reducing curling effects). Portions of the printed layers may also droop into hook slots 220 at top surface 194. However, printing multiple layers of support structure 24 to form an anchor base prior to printing 3D part 22, smoothes out any droops at hooks slots 220 and holes 196.

When the printing operation is completed, substrate 192 may be removed from platform portion 66, and the printed support structure 24 may be removed from holes 196, as discussed above. The resulting 3D part 22 and support structure 24 may then be placed in a support removal vessel to remove support structure 24 from 3D part 22. For example, support structure 24 may be printed from one or more support materials that are soluble in an aqueous solution (e.g., an alkaline aqueous solution). The expended substrate 192 may then be discarded, or more preferably, recycled.

FIG. 21 illustrates a hook/slot embodiment for substrate 206. As shown in this embodiment, platform portion 66 may include hook slots 224, and substrate 206 may include hook features 226. During use, substrate 206 may be placed on top surface 68 (manually or in an automated manner) such that hook features 226 slide into and securely engage hook slots 224. This secures substrate 206 to platform portion 66 for receiving a printed 3D part and support structure.

When a support structure (or 3D part) is printed on top surface 208, a portion of the printed material flows into holes 210 in a sprue-like manner, and forms mushroom heads 212 that extend beyond the bottom surface 214 of substrate 206 upon cooling. This locks the support structure to substrate 206, allowing the support structure to correspondingly anchor the 3D part (e.g., for reducing curling effects). When the printing operation is completed, substrate 206 may be removed from platform portion 66, and the printed support structure may be removed from holes 210, as discussed above. The resulting 3D part and support structure may then be placed in a support removal vessel to remove the support structure from the 3D part. Substrate 206 may then be reused for subsequent printing operations.

Substrates 192 and 206 (shown in FIGS. 15-21) illustrate example substrates that may be fabricated from low-cost materials, and that provide locking mechanisms for anchoring support structures and 3D parts during printing operations. Holes 196 and 210 provide suitable mechanisms for receiving the printed materials in a sprue-like manner, allowing mushroom heads 198 and 212 to lock the support structures to the substrates 192 and 206.

Holes 196 and 210 are preferably small enough, and spread apart enough such that they do not negatively impact the printing of support structure 24 (or 3D part 22). Examples of suitable average diameters for holes 196 and 210 range from about 0.02 inches to about 0.05 inches. Alternatively, holes 196 and 210 may have non-cylindrical cross-sectionals, where the average cross-sectional areas correspond to the above-discussed average diameters of holes 196 and 210.

Furthermore, while illustrated in use with platen assembly 32 and system 10, substrates 192 and 206 may alternatively be used with a variety of different platen assemblies and/or additive manufacturing systems. For example, substrates 192 and 206 may alternatively be used with other deposition-based additive manufacturing systems, such as jetting-based systems and other extrusion-based systems.

Due to the automated nature of system 10 and printer farm 10f, in some embodiments, the printed 3D parts 22, support structures 24, films 48, and/or substrates 192 and 206 may incorporate from machine-readable information and/or human-readable information for a variety of purposes (e.g., part tracking). For example, the printed 3D parts 22, support structures 24, films 48, substrates 192, and/or substrates 206 may incorporate identification tags, such as radio-frequency identification tags (RFID). Examples of suitable techniques, systems, and identification tags for use in this embodiment include those disclosed in Kozlak et al., U.S. Pat. No. 7,917, 243; Kozlak, U.S. Pat. No. 8,070,473; and Kozlak et al., U.S. Publication No. 2009/0173443.

Figure 22A:
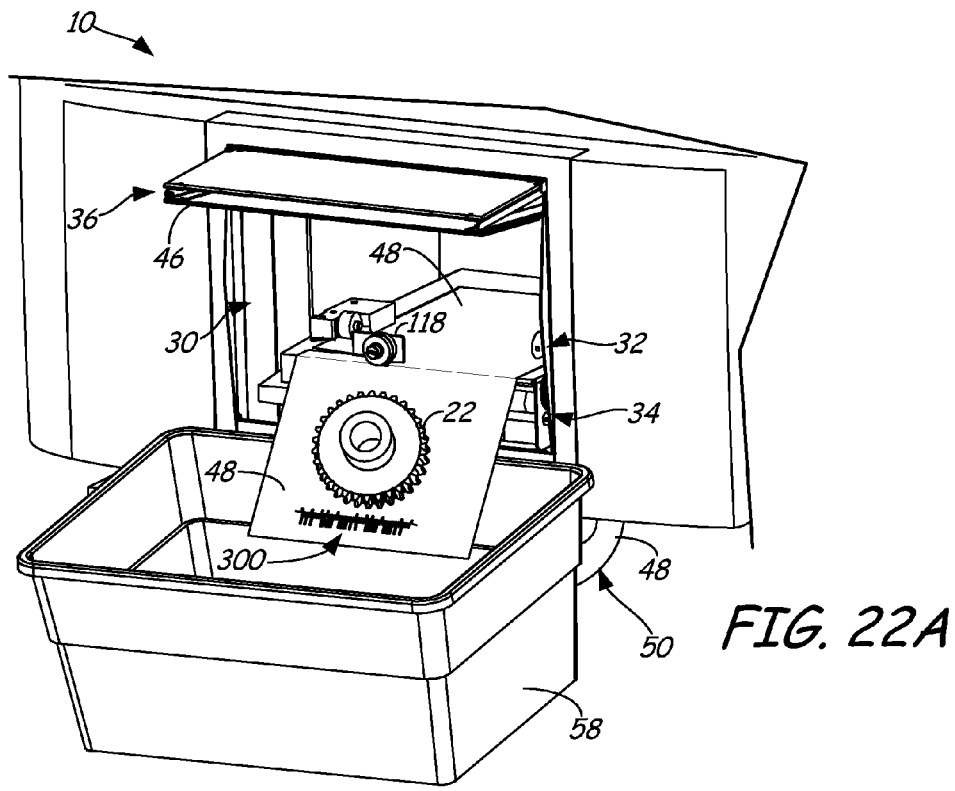
FIG. 22A is a schematic illustration of the system, as shown in FIG. 14F, depicting a process for printing and removing a 3D part and support structure, along with an example information-containing part.

Alternatively, FIG. 22A depicts a process for printing and removing an example 3D part 22 (and any underlying support structure 24) with system 10, where system 10 may also print information-containing part 300 on film 48 adjacent to 3D part 22. Part 300 may be printed from either the part or support material (or both) based on an encoding scheme that can be read by an optical scanner (not shown) and/or a user. As such, part 300 may function as a bar code to provide information relating to 3D part 22 (or multiple 3D parts printed on the same segment of film 48).

For example, part 300 may include tracking and/or routing information for directing where 3D part 22 may be transported to after exiting system 10, such as with one or more receiving devices 11 (e.g., receptacles, conveyor mechanisms, etc. . . . , shown above in FIG. 1). This is particularly suitable for use with a farm 10f of systems 10 where receiving devices 11 (or other devices in the farm 10f) may include scanners for routing the printed 3D parts 22 to desired locations in the processing line.

Additionally (or alternatively), part 300 may include information relating to one or more post-build operations to be performed on 3D part 22, such as support structure removal, surface smoothing processes, cooling operations, cleaning operations, machining, benching, painting, packaging, and combinations thereof. Part 300 may also include identification information for 3D part 22, such as customer information, digital part information, batch and lot numbers, purchase information, part identification information, job queue orders, and other similar types of identification details.

Part 300 may also include information relating to a variety of additional manufacturing steps in an overall manufacturing process. For example, system 10 may be a single step of multiple steps in a manufacturing process (e.g., a digital manufacturing process). As such, the information retained by part 300 may be used to assist in performing the subsequent steps in the manufacturing process. For example, part 300 may provide tracking and processing instructions for a variety of subsequent manufacturing steps, such as painting, machining, gluing, annealing, metrology, stressing, plating, and combinations thereof.

Figure 22B:
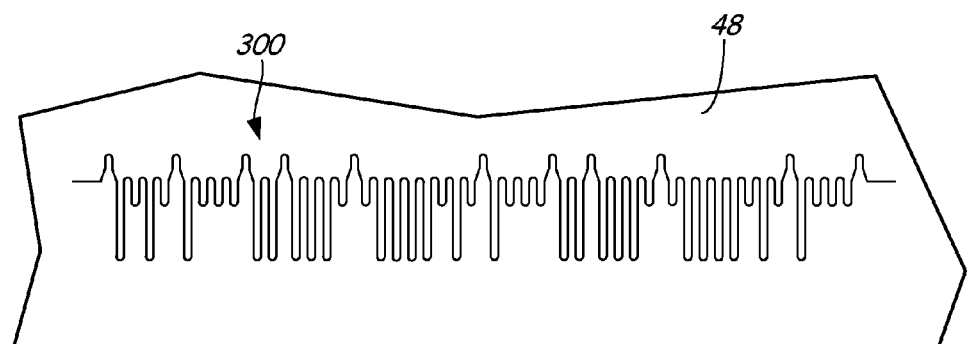
FIG. 22B is a top view of the example information-containing part.

FIG. 22B further illustrates part 300 on film 48, where part 300 is an example information-containing part that may be printed with system 10. In alternative embodiments, part 300 may be printed using different encoding schemes, multiple sub-parts, different 3D printing techniques, multiple layers, and the like. However, part 300 is suitable for used with system 10 since it can be printed as a single-layer road (i.e., on a single start point and a single stop point), following a single-layer tool path, which reduces the time required to print part 300. Alternatively, part 300 may be printed with multiple layers and subsequently removed from film 48 along with 3D part 22 and/or support structure 24. This allows part 300 to be retained with 3D part 22 during one or more post-printing steps.

As shown in FIG. 22B, part 300 includes different bar lengths, which allow information to be encoded using an identification or encoding scheme. In different identification schemes, part 300 may utilize different geometries to attain the desired level of encoding. Additionally, the amount of information that may be encoded may also be increased by increasing the length of part 300 (and/or utilizing multiple parts 300), where the dimensions of part 300 are only limited by the spacing size of film 48 (or other build platform, such as conventional build platforms, as well as substrates 192 and 206).

The data for part 300 may be generated using a computer system by identifying one or more locations on the footprint area of film 48 that 3D part 22 (or multiple 3D parts 22) will not cover. In some embodiments, this may be a pre-designated footprint area in system 10 over which 3D part 22 (and any support structure 24) are prevented from being printed on. The computer system may then generate encoded information relating to part 300 using a desired encoding scheme, and then generate tool path data for printing part 300 based on the encoded information. The generated tool path data may then be transmitted from the computer system to system 10, and system 10 may then print part 300 based on the generated tool path data in the identified or pre-designated location on film 48.

As mentioned above, part 300 may be printed from the part material, the support material, of both. Because part 300 may be optically read (e.g., as a bar code), the color of the material use to print part 300 preferably provides a color contrast relative to an underlying surface. In the shown embodiment, where film 48 may be a thin sheet of clear film, the material color for part 300 is desirably selected to contrast a base surface of the optical scanner used to read part 300.

For example, if the base surface of the optical scanner is black, part 300 may be printed from a bright-colored material (e.g., a bright-red-colored material or a fluorescent material) or a light-colored material (e.g., a white-colored material). Similarly, if part 300 is printed on a dark substrate (e.g., a black-colored substrate), part 300 may also be printed from a bright or light-colored material. However, if part 300 is printed on a white substrate, part 300 is preferably printed from a dark-colored material to maintain a suitable contrast.

Figure 22C:
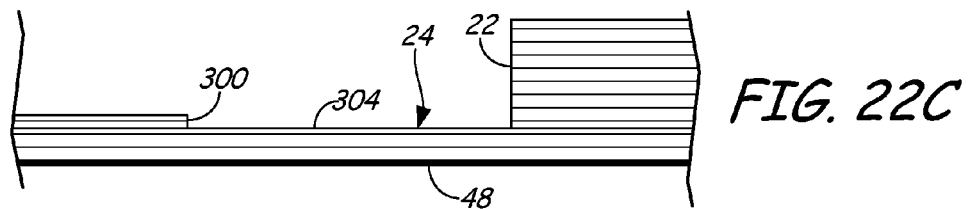
FIG. 22C is a side view of an example 3D part and information-containing part, which are interconnected by a bridge portion of a support structure.

As shown in FIG. 22C, in an alternative embodiment, support structure 24 may extend below both 3D part 22 (to anchor 3D part 22 to film 48, as discussed above) and below part 300, with a bridge portion 304 of the support material extending therebetween. In this embodiment, part 300 may be printed in one or more layers and subsequently removed from film 48 along with 3D part 22 and/or support structure 24. Part 300 may subsequently be separated from 3D part 22 when removing support structure 24 (in a support removal step). This also allows part 300 to be retained with 3D part 22 during one or more post-printing steps.

Figure 23:
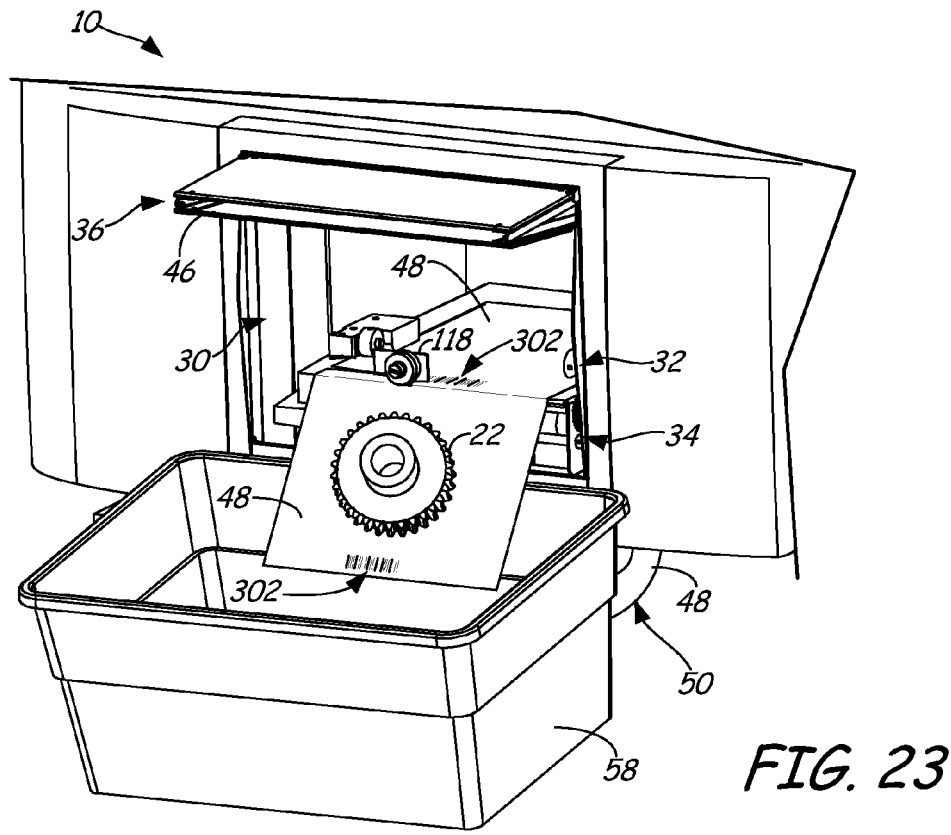
FIG. 23 is a schematic illustration of the system, as shown in FIG. 14F, depicting a process for printing and removing a 3D part and support structure, with a film having pre-printed information.

FIG. 23 illustrates an alternative to the above-discussed embodiment with information-containing part 300 (shown in FIGS. 22A and 22B). In this embodiment, film 48 may include a series of successive information-containing markings 302 that may function in the same manner as part 300. Accordingly, each marking 302 may include the same types of information as discussed above for part 300.

In this case, however, markings 302 are preferably pre-printed on film 48 prior to use in system 10. Since removal assembly 34 may advance film 48 by known increments between each printing operation, the successive markings 302 may be pre-printed with proper registration along the length of film 48 such that at least one marking 302 is present for each cut segment of film 48, such as shown in FIG. 23. While illustrated at the leading edges of each segment of film 48, markings 302 may alternatively be located at any other suitable location on film 48, as such as along the lateral edges and/or at trailing edge of each segment of film 48.

In this embodiment, system 10 and/or one or more of the receiving devices 11 preferably include an optical scanner to read the information from markings 302 as the given segment of film 48 passes through and/or exits chamber 30. This allows system 10 to associate the given marking 302 with the corresponding print operation (e.g., in a printing queue). As such, markings 302 may be in a similar manner to part 300.

Figure 24:
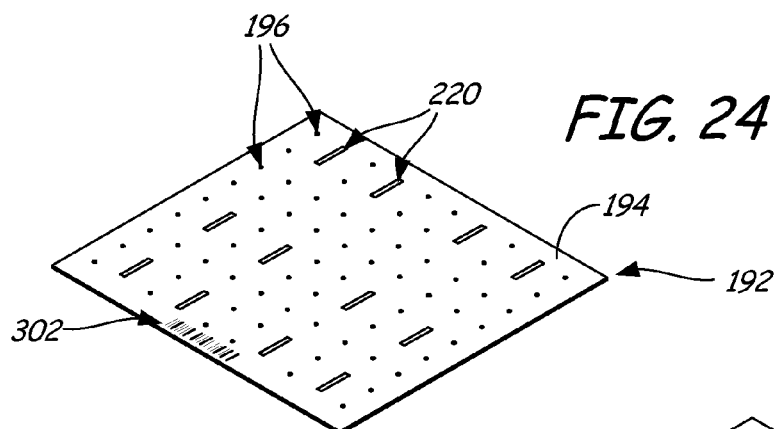
FIG. 24 is an isometric view of an alternative substrate for use in either the first alternative platform assembly (as shown in FIGS. 15 and 16) or the third alternative platform assembly (as shown in FIGS. 19 and 20), where the substrate includes pre-printed information.
Figure 25:
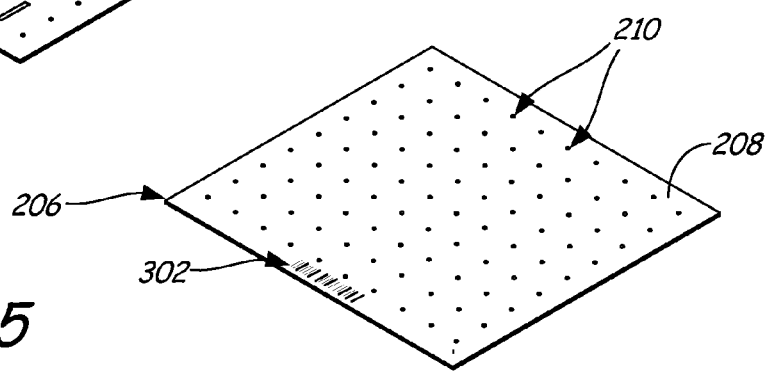
FIG. 25 is an isometric view of an alternative substrate for use in either the second alternative platform assembly (as shown in FIGS. 17 and 18) or the fourth alternative platform assembly (as shown in FIG. 21), where the substrate includes pre-printed information.

FIGS. 24 and 25 illustrate further alternative embodiments in which substrate 192 and or substrate 206 include information-containing markings 302, which may also be pre-printed markings on substrates 192 and/or 206 that may also function in the same manner as information-containing part 300. Substrate 192 shown in FIG. 24 may correspond to the embodied substrate 192 as shown in FIGS. 15 and 16 and/or the embodied substrate 192 shown in FIGS. 19 and 20. Correspondingly, Substrate 206 shown in FIG. 25 may correspond to the embodied substrate 206 as shown in FIGS. 17 and 18 and/or the embodied substrate 206 shown in FIG. 21.

Although the present disclosure has been described with reference to preferred embodiments, workers skilled in the art will recognize that changes may be made in form and detail without departing from the spirit and scope of the disclosure.

The invention claimed is:

1. A method for printing a three-dimensional part with an additive manufacturing system, the method comprising:
   securing a segment of a film to a platen assembly of the additive manufacturing system;
   printing an information-containing part on the secured segment of the film, wherein the information-containing part comprises encoded information relating to the three-dimensional part;
   printing the three-dimensional part on the secured segment of the film;
   releasing the secured segment of the film having the printed information-containing part and the printed three-dimensional part thereon from the platen assembly;
   removing the released segment of the film having the printed information-containing part and the printed three-dimensional part from the additive manufacturing system, wherein said removing comprises:
      drawing the released segment of the film having the printed information-containing part and the printed three-dimensional part thereon from the platen assembly to a removal assembly; and
      separating the drawn segment of the film having the printed information-containing part and the printed three-dimensional part thereon from a subsequent segment of the film.

2. The method of claim 1, the method further comprising:
   optionally printing a support structure for the three-dimensional part on the secured segment of the film, wherein printing the information-containing part on the secured segment of the film comprises:
      printing the information-containing part using the same printing technique and printing material as used for printing the three-dimensional part and/or the support structure for the three-dimensional part.

3. The method of claim 2, wherein printing the information-containing part on the secured segment of the film comprises printing the information-containing part by melt extrusion.

4. The method of claim 3, wherein printing the information-containing part on the secured segment of the film comprises printing the information-containing part as a single-layer road.

5. The method of claim 1, the method further comprising:
   encoding information with a computer system using an encoding scheme;
   generating, with the computer system, tool path data for the information-containing part based on the encoded information; and
   transmitting, with the computer system, the generated tool path data for the information-containing part to the additive manufacturing system.

6. The method of claim 1, wherein drawing the released segment of the film comprises:
   engaging the film with a drive roller;
   operating a first motor to generate rotational power; and rotating the drive roller based on the generated rotational power from the first motor.

7. The method of claim 6, wherein separating the drawn segment of the film comprises:
operating a second motor to generate rotational power; and
moving a blade unit across the film based on the generated rotational power from the second motor.

8. The method of claim 1, wherein securing the segment of the film against the platen assembly comprises:
biasing a retention bracket of the platen assembly against a surface of the platen assembly, wherein the segment of the film is pressed between the retention bracket and a portion of the surface.

9. The method of claim 8, wherein securing the segment of the film against the platen assembly further comprises:
drawing a vacuum across the surface to restrain the segment of the film against said surface.

10. A method for printing a three-dimensional part with an additive manufacturing system, the method comprising:
securing a substrate to a platen assembly of the additive manufacturing system, wherein the substrate comprises a plurality of holes;
printing one or more layers of a support structure on the secured substrate, wherein portions of the one or printed layers penetrate into at least a portion of the holes in a sprue-like manner to form mushroom heads that lock the support structure to the secured substrate;
printing the three-dimensional part on the one or more printed layers of the support structure;
releasing the substrate having the printed three-dimensional part thereon from the platen assembly; and
removing the printed three-dimensional part and at least a portion of the one or more printed layers of the support structure from the substrate.

11. The method of claim 10, wherein the substrate comprises a multi-layer substrate having interior porous regions, and wherein the mushroom heads are formed in the interior porous regions.

12. The method of claim 10, wherein the substrate has a first surface and a second opposing surface, and wherein the plurality of holes extend through the first surface and the second opposing surface.

13. The method of claim 10, wherein securing the substrate to the platen assembly comprises locking the substrate to the platen assembly with a plurality of hook features and hook slots.

14. The method of claim 13, wherein the platen assembly comprises the hook slots, and the substrate comprises the hook features.

15. The method of claim 10, wherein the substrate is derived from one or more polymeric materials, one or more paper-based materials, or combinations thereof.

16. The method of claim 10, wherein removing the printed three-dimensional part and at least the portion of the one or more printed layers of the support structure comprises cutting the formed mushroom heads.

17. The method of claim 10, the method further comprising:
printing an information-containing part on the secured substrate, wherein the information-containing part comprises encoded information relating to the three-dimensional part.

18. The method of claim 17, the method further comprising:
encoding information with a computer system using an encoding scheme;
generating, with the computer system, tool path data for the information-containing part based on the encoded information; and
transmitting, with the computer system, the generated tool path data for the information-containing part to the additive manufacturing system.

* * * * *